(12) United States Patent
Wu et al.

(10) Patent No.: US 11,636,872 B2
(45) Date of Patent: Apr. 25, 2023

(54) TECHNIQUES FOR COMPUTING PERCEIVED AUDIO QUALITY BASED ON A TRAINED MULTITASK LEARNING MODEL

(71) Applicant: NETFLIX, INC., Los Gatos, CA (US)

(72) Inventors: Chih-Wei Wu, Los Gatos, CA (US); Phillip A. Williams, Los Gatos, CA (US); William Francis Wolcott, IV, Los Gatos, CA (US)

(73) Assignee: NETFLIX, INC., Los Gatos, CA (US)

( * ) Notice: Subject to any disclaimer, the term of this patent is extended or adjusted under 35 U.S.C. 154(b) by 137 days.

(21) Appl. No.: 16/905,810

(22) Filed: Jun. 18, 2020

(65) Prior Publication Data

US 2021/0350820 A1  Nov. 11, 2021

Related U.S. Application Data

(60) Provisional application No. 63/021,635, filed on May 7, 2020.

(51) Int. Cl.
| | |
|---|---|
| *G10L 25/60* | (2013.01) |
| *G10L 25/27* | (2013.01) |
| *G06K 9/62* | (2022.01) |
| *G06N 20/00* | (2019.01) |
| *G06F 17/18* | (2006.01) |

(52) U.S. Cl.
CPC ............. *G10L 25/60* (2013.01); *G06K 9/623* (2013.01); *G06K 9/6256* (2013.01); *G06N 20/00* (2019.01); *G10L 25/27* (2013.01); *G06F 17/18* (2013.01)

(58) Field of Classification Search
CPC ...................................................... G10L 25/60
See application file for complete search history.

(56) References Cited

U.S. PATENT DOCUMENTS

| | | | |
|---|---|---|---|
| 9,635,483 B2 | 4/2017 | Francombe et al. | |
| 2018/0158470 A1* | 6/2018 | Zhu | .......... G10L 25/81 |
| 2019/0385480 A1 | 12/2019 | Suzuki | |
| 2020/0022007 A1* | 1/2020 | Ouyang | .................. G10L 15/26 |
| 2020/0227070 A1* | 7/2020 | Kim | .......... G10L 25/60 |
| 2020/0349467 A1 | 11/2020 | Teague | |
| 2020/0402530 A1 | 12/2020 | Güzelarslan | |
| 2021/0125629 A1* | 4/2021 | Bryan | ...................... G10L 25/60 |
| 2021/0217403 A1* | 7/2021 | Chae | ...................... G10L 13/033 |
| 2021/0256988 A1* | 8/2021 | Gallart Mauri | ..... G10L 21/0232 |

(Continued)

OTHER PUBLICATIONS

Wilkinghoff, Kevin, et al. "Robust speaker identification by fusing classification scores with a neural network." Speech Communication; 13th ITG-Symposium. VDE, 2018. (Year: 2018).*

(Continued)

*Primary Examiner* — Douglas Godbold
(74) *Attorney, Agent, or Firm* — Artegis Law Group, LLP

(57) ABSTRACT

In various embodiments, a quality inference application estimates perceived audio quality. The quality inference application computes a set of feature values for a set of audio features based on an audio clip. The quality inference application then uses a trained multitask learning model to generate predicted labels based on the set of feature values. The predicted labels specify metric values for metrics that are relevant to audio quality. Subsequently, the quality inference application computes an audio quality score for the audio clip based on the predicted labels.

18 Claims, 5 Drawing Sheets

(56) References Cited

U.S. PATENT DOCUMENTS

2021/0264938 A1* 8/2021 Yao .................... G10L 21/007
2021/0272583 A1* 9/2021 Liu .................... G06N 3/0454

OTHER PUBLICATIONS

Zhang, Zixing, et al. "Unsupervised learning in cross-corpus acoustic emotion recognition." 2011 IEEE Workshop on Automatic Speech Recognition & Understanding. IEEE, 2011. (Year: 2011).*
Olson, David L. "Geometric Mean Technique." Decision Aids for Selection Problems. Springer, New York, NY, 1996. 69-80. (Year: 1996).*
Avila et al., "Non-Intrusive Speech Quality Assessment Using Neural Networks", In Proceedings of the International Conference on Acoustics, Speech, and Signal Processing (ICASSP), Mar. 2019, pp. 1-5.
Beerends et al., "Perceptual Objective Listening Quality Assessment (POLQA), The Third Generation ITU-T Standard for End-to-End Speech Quality Measurement Part I—Temporal Alignment", Journal of the Audio Engineering Society, vol. 61, No. 6, 2013, pp. 366-384.
Biberger et al., "An Objective Audio Quality Measure Based on Power and Envelope Power Cues", Journal of the Audio Engineering Society, DOI: https://doi.org/10.17743/jaes.2018.0031, vol. 66, No. 7/8, Jul./Aug. 2018, pp. 578-593.
Bock et al., "Multi-Task Learning of Tempo and Beat: Learning One to Improve the Other", In Proceedings of the 20th ISMIR Conference, Nov. 4-8, 2019, pp. 486-493.
Campbell et al., "Audio quality assessment techniques—A review,and recent developments", Signal Processing, doi:10.1016/j.sigpro.2009.02.015, vol. 89, No. 8, Aug. 2009, pp. 1489-1500.
Caruana, Rich, "Multitask Learning", Machine learning, vol. 28, No. 35, 1997, pp. 41-75.
Chen et al., "Functional Harmony Recognition of Symbolic Music Data With Multi-Task Recurrent Neural Networks", In Proceedings of the 19th ISMIR Conference, Sep. 23-27, 2018, pp. 90-97.
Dau et al., "Modeling auditory processing of amplitude modulation. I. Detection and masking with narrow-band carriers". The Journal of the Acoustical Society of America, vol. 102, No. 5, Nov. 1997, pp. 2892-2905.
Dau et al., "Modeling auditory processing of amplitude modulation. II. Spectral and temporal integration", The Journal of the Acoustical Society of America, vol. 102, No. 5, Nov. 1997, pp. 2906-2919.
Emiya et al., "Subjective and Objective Quality Assessment of Audio Source Separation", IEEE Transactions on Audio, Speech, and Language Processing, vol. 19, No. 7, Sep. 2011, pp. 2046-2057.
Hines et al., "ViSQOLAudio: An objective audio quality metric for low bitrate codecs", Journal of the Acoustical Society of America, http://dx.doi.org/10.1121/1.4921674, vol. 137, No. 6, Jun. 2015, pp. EL449-EL455.
Hines et al., "ViSQOL: an objective speech quality model", EURASIP Journal on Audio, Speech, and Music Processing, DOI 10.1186/s13636-015-0054-9, vol. 1, No. 13, Dec. 2015, pp. 1-18.
Huber et al., "PEMO-Q—A New Method for Objective Audio Quality Assessment Using a Model of Auditory Perception", IEEE Transactions on Audio, Speech and Language Processing, vol. 14, No. 6, Nov. 2006, pp. 1902-1911.
Hung et al., "Multitask Learning for Frame-Level Instrument Recognition", In Proceedings of the International Conference on Acoustics, Speech, and Signal Processing (ICASSP), arXiv:1811.01143, 2019, 5 pages.
Kates et al., "The Hearing-Aid Speech Quality Index (HASQI) Version 2", Journal of the Audio Engineering Society, vol. 62, No. 3, Mar. 2014, pp. 99-117.
Kates et al., "The Hearing-Aid Audio Quality Index (HAAQI)", IEEE/ACM Transactions on Audio, Speech, and Language Processing, vol. 24, No. 2, Feb. 2016, pp. 354-365.

Manocha et al., "A Differentiable Perceptual Audio Metric Learned from Just Noticeable Differences", In arXiv—arXiv:2001.4460, May 2020, 6 pages.
Martinez et al., "a No-Reference Audio-Visual Video Quality Metric", In Proceedings of the European Signal Processing Conference (EUSIPCO), 2014, 5 pages.
Moore, Brian C. J., "Computational models for predicting sound quality", Acoustical Science and Technology, vol. 41, No. 1, Jan. 2020, pp. 75-82.
Pocta et al., "Subjective and Objective Assessment of Perceived Audio Quality of Current Digital Audio Broadcasting Systems and Web-Casting Applications", IEEE Transactions on Broadcasting, vol. 61, No. 3, Sep. 2015, pp. 407-415.
Rix et al., "Perceptual Evaluation of Speech Quality (PESQ)—A New Method For Speech Quality Assessment of Telephone Networks and Codecs", In Proceedings of the International Conference on Acoustics, Speech, and Signal Processing (ICASSP), 2001, pp. 749-752.
Rix et al., "Objective Assessment of Speech and Audio Quality—Technology and Applications", IEEE Transactions on Audio, Speech and Language Processing, DOI 10.1109/TASL.2006.883260, vol. 14, No. 6, Nov. 2006, pp. 1890-1901.
Sloan et al., "Objective Assessment of Perceptual Audio Quality Using ViSQOLAudio", IEEE Transactions on Broadcasting, DOI 10.1109/TBC.2017.2704421, vol. 63, No. 4, Dec. 2017, pp. 693-705.
Thiede et al., "PEAQ-The ITU Standard for Objective Measurement of Perceived Audio Quality", Journal of the Audio Engineering Society, vol. 48, No. 1, 2000, pp. 3-29.
Torcoli et al., "Comparing the Effect of Audio Coding Artifacts on Objective Quality Measures and on Subjective Ratings", In Proceedings of the Audio Engineering Society (AES) convention, May 23-26, 2018, pp. 1-10.
International Telecommunication Union, Recommendation ITU-T p. 861, "Objective quality measurement of telephone-band (300-3400 Hz) speech codecs", 1996, 34 pages.
International Telecommunication Union, Recommendation ITU-T p. 563:, "Single-ended method for objective speech quality assessment in narrow-band telephony applications", 2004, 66 pages.
International Telecommunication Union, Recommendation ITU-R BS.1116-3:, "Methods for the subjective assessment of small impairments in audio systems", 2015, pp. 1-32.
International Telecommunication Union, Recommendation ITU-R BS.1534-3:, "Method for the subjective assessment of intermediate quality level of audio systems", 2015, pp. 1-36.
Wang et al., "Image Quality Assessment: From Error Visibility to Structural Similarity", IEEE Transactions on Image Processing, vol. 13, No. 4, Apr. 2004, pp. 600-612.
Zielinski et al., "On Some Biases Encountered in Modern Audio Quality Listening Tests—A Review", Journal of the Audio Engineering Society, vol. 56, No. 6, Jun. 2008, pp. 427-451.
TSP Lab Software, "Telecommunications & Signal Processing Laboratory Multimedia Signal Processing", Retrieved from http://www-mmsp.ece.mcgill.ca/Documents/Software, on Jan. 21, 2021, 3 pages.
The PEASS Toolkit—Perceptual Evaluation methods for Audio Source Separation, "The PEASS Software", Retrieved from http://bass-db.gforge.inria.fr/peass/PEASS-Software.html, on Jan. 21, 2021, 2 pages.
Audio and Music, "Quality of Experience Research Lab | QxLab", Retrieved from https://qxlab.ucd.ie/index.php/audio-and-music, on Jan. 14, 2021, 2 pages.
Librosa, Retrieved from https://librosa.org/doc/latest/index.html, on Jan. 21, 2021, 3 pages.
GitHub, "alexanderlerch/pyACA", Retrieved from https://github.com/alexanderlerch/pyACA, on Jan. 21, 2021, 4 pages.
GitHub, scikit-learn, "Machine Learning in Python", Release Highlights for 0.24, Retrieved from https://scikit-learn.org/stable/, 2021, 2 pages.
TensorFlow Core v2.4.0, "Module: tf.keras", Retrieved from https://www.tensorflow.org/api_docs/python/tf/keras, on Jan. 21, 2021, 3 pages.

(56) References Cited

OTHER PUBLICATIONS

FFmpeg, "A complete, cross-platform solution to record, convert and stream audio and video", Retrieved from https://www.ffmpeg.org/, on Jan. 21, 2021, 28 pages.

International Telecommunication Union, Recommendation ITU-R BS.1387-1, Retrieved from https://www.itu.int/rec/R-REC-BS.1387-1-200111-I/en, 1998-2001, pp. 1-100.

Results of the public multiformat listening test, Retrieved from http://listening-test.coresv.net/results.htm, on Jan. 21, 2021, 49 pages.

Video Quality Databases, Retrieved from http://www.ene.unb.br/mylene/databases.html, on Jan. 21, 2021, 6 pages.

GitHub, "Perceptual-Coding-In-Python", Retrieved from https://github.com/stephencwelch/Perceptual-Coding-In-Python/tree/master/PEAQPython/PQevalAudioMATLAB, on Jan. 21, 2021, 2 pages.

GitHub, "Perceptual-Coding-In-Python", Retrieved from https://github.com/stephencwelch/Perceptual-Coding-In-Python/tree/master/PEAQPython, on Jan. 21, 2021, 1 page.

GitHub, "EAQUAL", Retrieved from https://github.com/godock/eaqual, on Jan. 21, 2021, 5 pages.

GitHub, "python-pesq", Retrieved from https://github.com/vBaiCai/python-pesq, on Jan. 21, 2021, 4 pages.

GitHub, "mos-ivr", Retrieved from https://github.com/stingerpk/mos-ivr/tree/master/P563, on Jan. 21, 2021, 5 pages.

GitHub, "peass-software", Retrieved from https://github.com/CVSSP/peass-software/blob/master/pemo_metric.m, on Jan. 21, 2021, 3 pages.

GitHub, "dmca", Retrieved from https://github.com/github/dmca/blob/master/2018/2018-02-14-POLQA.md, on Jan. 21, 2021, 5 pages.

International Search Report for application No. PCT/US2021/030968 dated Jul. 30, 2021.

Choi et al., "Neural MOS prediction for synthesized speech using multi-task learning with spoofing detection and spoofing type classification", 2021 IEEE spoken language technology workshop (SLT), IEEE, DOI:10.1109/SLT48900.2021.9383533, Jan. 19, 2021, pp. 462-469.

Sharma et al., "Non-Intrusive POLQA Estimation of Speech Quality using Recurrent Neural Networks", 27th European Signal Processing Conference (EUSIPCO), DOI: 10.23919/EUSIPC0.2019.8902646, Sep. 2, 2019, 5 pages.

Dong et al., "An Attention Enhanced Multi-Task Model for Objective Speech Assessment in Real-World Environments", IEEE International Conference on Acoustics, Speech and Signal processing (ICASSP), IEEE, DOI: 10.1109/ICASSP40776.2020.9053366, 2020, pp. 911-915.

Non Final Office Action received for U.S. Appl. No. 16/905,793 dated Apr. 1, 2022, 47 pages.

Final Office Action received for U.S. Appl. No. 16/905,793 dated Aug. 8, 2022, 43 pages.

Kang et al., "Machine Learning: Data Pre-processing", Prognostics and Health Management of Electronics: Fundamentals, Machine Learning, and the Internet of Things, Chapter 5, 2018, pp. 111-130.

Non Final Office Action received for U.S. Appl. No. 16/905,793 dated Feb. 14, 2023, 55 pages.

\* cited by examiner

TECHNIQUES FOR COMPUTING PERCEIVED AUDIO QUALITY BASED ON A TRAINED MULTITASK LEARNING MODEL

CROSS-REFERENCE TO RELATED APPLICATIONS

This application claims priority benefit of the United States Provisional Patent Application titled, "TECHNIQUES FOR PERCEPTUAL AUDIO QUALITY ASSESSMENT," filed on May 7, 2020 and having Ser. No. 63/021,635. The subject matter of this related application is hereby incorporated herein by reference.

BACKGROUND

Field of the Various Embodiments

The various embodiments relate generally to computer science, artificial intelligence, and audio technology and, more specifically, to techniques for computing perceived audio quality based on a trained multitask learning model.

Description of the Related Art

Assessing the quality levels of discrete portions of audio signals known as "audio clips" is an important aspect of developing and verifying certain types of audio algorithms, such as audio coders, filtering algorithms, source separation algorithms, etc. Among other things, applying a given audio algorithm to a representative set of reference audio clips and then determining quality levels of the resulting target audio clips, as perceived by actual listeners, can provide valuable insight into the audio quality versus processing efficiency tradeoffs associated with the audio algorithm or the impact the audio algorithm has on overall perceived audio quality.

Directly determining the perceived audio quality levels of audio clips usually involves conducting a subjective listening test. During a typical subjective listening test, multiple people listen to and manually assign subjective quality scores to a set of training audio clips that represents multiple different types of audio content and various audio distortions or "artifacts." Because designing and conducting a subjective listening test that yields reliable results can be prohibitively time consuming, some attempts have been made to estimate perceived audio quality levels computationally.

In one approach to computationally estimating the perceived audio quality level of a target audio clip, a software application computes values for a set of audio features based on the target audio clip and the associated source audio clip. Each audio feature characterizes one or more aspects of an audio signal that can impact the sounds that people perceive when listening to the audio signal. The software application then maps the values for the set of audio features to a quality score via a perceptual quality model that has been trained using training data that consists of labeled audio clips. The labels associated with the different audio clips are determined from subjective quality scores assigned by human listeners.

One drawback of the above approach is that the perceptual quality models typically implemented lack robustness. In this regard, because conducting effective subjective listening tests to determine the different labels for the labeled audio clips can be quite time consuming, perceptual quality models are oftentimes trained using only a small number of labeled audio clips that represent only limited types of audio content and audio artifacts. Consequently, in cases where the target audio clip include types of audio content or types of audio artifacts not represented in any of the labeled audio clips, the perceptual quality model, most likely, is not going to be able to accurately predict how human listeners are going to perceive the quality of those target audio clips.

Some other approaches attempt to apply speech-based machine learning models to perceptual audio quality assessment. However, because speech is a narrow subset of audio, speech-based machine learning models are usually unable to accurately predict perceptual audio quality levels for audio clips that include non-verbal sounds, such as music, sound effects, animal noises, etc.

As the foregoing illustrates, what is needed in the art are more effective techniques for assessing perceived audio quality levels of audio clips.

SUMMARY

One embodiment of the present invention sets forth a method for estimating perceived audio quality. The method includes computing a first set of feature values for a set of audio features based on a first audio clip; generating a first set of predicted labels via a trained multitask learning model based on the first set of feature values, where the first set of predicted labels specifies metric values for a set of metrics that are relevant to audio quality; and computing a first audio quality score for the first audio clip based on the first set of predicted labels.

At least one technical advantage of the disclosed techniques relative to the prior art is that the disclosed techniques can be used to accurately estimate perceived audio quality levels for audio clips spanning diverse types of audio content and audio distortions. With the disclosed techniques, because the trained multitask learning model is trained based on unlabeled audio clips, the trained multitask learning model can be efficiently trained using a broader range of training data relative to prior art techniques. In particular, the training data can represent wide ranges of verbal sounds, non-verbal sounds, and audio distortions. As a result, relative to prior art techniques, the trained multitask learning model can be used to more accurately and reliably assess perceived audio quality levels for audio clips in general. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
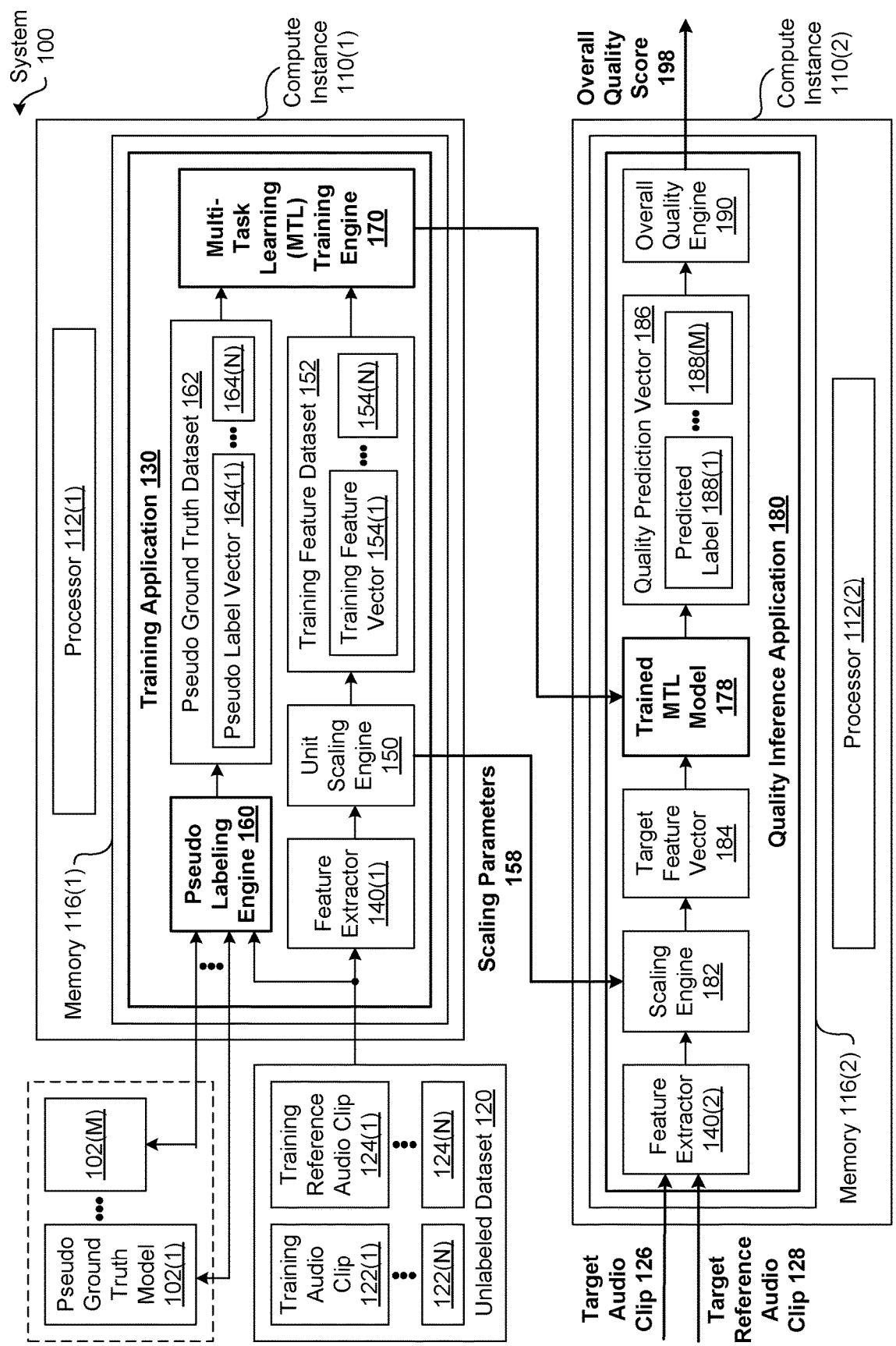
FIG. 1 is a conceptual illustration of a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

Effectively encoding "reference" audio clips is often an important aspect of delivering a variety of media items, such as songs, movies, television shows, etc. After an encoded version of a reference audio clip is received, the encoded version of the reference audio clip is decoded to generate a target audio clip that is played for users. Accordingly, understanding the perceived audio quality levels of target audio clips derived from reference audio clips via an encoder/decoder ("codec") is useful when developing and/or verifying the audio codec for use in delivering media items. Because manually assessing the perceived audio quality levels of target audio clips can be prohibitive time consuming, some attempts have been made to estimate perceived audio quality levels computationally.

In one approach to computationally estimating the perceived audio quality level of a target audio clip, a software application estimates a quality score using a perceptual quality model that has been trained using labeled audio clips. The labels associated with the different audio clips are usually determined from subjective quality scores assigned by human listeners during subjective listening tests. One drawback of these types perceptual quality models is that because conducting effective subjective listening tests can be quite time consuming, perceptual quality models are oftentimes trained using only a small number of labeled audio clips that represent only limited types of audio content and audio artifacts. Consequently, the perceptual quality models lack robustness. In particular, when a target audio clip includes types of audio content or types of audio artifacts not represented in any of the labeled audio clips, the perceptual quality model, most likely, is not going to be able to accurately estimate the perceived audio quality level of the target audio clip.

With the disclosed techniques, however, a training application trains a multitask learning ("MTL") model using a relatively large set of unlabeled training audio clips to jointly predict the quality scores output by multiple perceptual quality models. A quality inference application uses the resulting trained MTL model to compute predicted quality scores for a target audio clip. The quality inference application then aggregates and, optionally, scales the predicted quality scores to generate an overall quality score that estimates the perceived quality level of the audio clip.

In some embodiments, for each of any number of unlabeled training audio clips, the training application generates a pseudo label vector and a training feature vector. Each pseudo label vector includes, without limitation, any number of pseudo labels, where each pseudo label is a scaled version of the quality score for the associated training audio clip as computed using a different perceptual quality model. Each of the training feature vectors includes, without limitation, a set of MTL feature values for the associated unlabeled training audio clip. The set of MTL feature values specifies values for a set of MTL features, where each MTL feature can characterize any aspect of an audio signal in any technically feasible fashion. The training application also computes scaling parameters that map the MTL feature values for different MTL features to a single range. The training application executes a multitask training algorithm on an untrained MTL model based on the training feature vectors and the pseudo label vectors. The training application transmits the resulting trained MTL model and the scaling parameters to the quality inference application.

For each of any number of target audio clips, the quality inference application computes a target feature vector based on the target audio clip, a target reference audio clip, and the scaling parameters. The target feature vector includes, without limitation, a set of MTL feature values for the target audio clip. The quality inference application inputs the target feature vector into the trained MTL model and, in response, the trained MTL model outputs a quality prediction vector. The quality prediction vector includes, without limitation, a different predicted label for each of the perceptual quality models. Each predicted label predicts a scaled version of the quality score that the associated perceptual quality model would compute for the target audio clip. The quality inference application computes the geometric mean of the predicted labels and then scales the aggregate score to a range typically associated with subjective scores to compute an overall quality score for the target audio clip.

At least one technical advantage of the disclosed techniques relative to the prior art is that the quality inference application can accurately estimate perceived audio quality levels for audio clips spanning diverse types of audio content and audio distortions. Because the training application trains the multitask learning model based on unlabeled data, the multitask learning model can be efficiently trained using a broad range of training data. In particular, the training data can properly represent wide ranges of non-verbal content, verbal content, and audio distortions. As a result, the trained MTL model can accurately and reliably estimate the audio metrics for audio clips in general. These technical advantages provide one or more technological improvements over prior art approaches.

System Overview

FIG. 1 is a conceptual illustration of a system 100 configured to implement one or more aspects of the various embodiments. For explanatory purposes, multiple instances of like objects are denoted with reference numbers identifying the object and parenthetical alphanumeric character(s) identifying the instance where needed. As shown, the system 100 includes, without limitation, compute instances 110(1) and 110(2), an unlabeled dataset 120, pseudo ground truth models 102(1)-102(M), where M is any integer greater than 1, a target audio clip 126, and a target reference audio clip 128.

In some alternate embodiments, the system 100 can include, without limitation, any number of compute instances 110, any number of target audio clips 126, and any number of target reference audio clips 128. The components of the system 100 can be distributed across any number of shared geographic locations and/or any number of different geographic locations and/or implemented in one or more cloud computing environments (i.e., encapsulated shared resources, software, data, etc.) in any combination.

As shown, the compute instance 110(1) includes, without limitation, a processor 112(1) and a memory 116(1), and the compute instance 110(2) includes, without limitation, a processor 112(2) and a memory 116(2). The compute instances 110(1) and 110(2) are also referred to herein individually as "the compute instance 110" and collectively as "the compute instances 110." The processors 112(1) and 112(2) are also referred to herein individually as "the processor 112" and collectively as "the processors 112." The memories 116(1) and 116(2) are also referred to herein individually as "the memory 116" and collectively as "the memories 116." Each of the compute instances 110 may be implemented in a cloud computing environment, implemented as part of any other distributed computing environment, or implemented in a stand-alone fashion.

The processor 112 may be any instruction execution system, apparatus, or device capable of executing instructions. For example, the processor 112 could comprise a central processing unit, a graphics processing unit, a controller, a micro-controller, a state machine, or any combination thereof. The memory 116 of the compute instance 110 stores content, such as software applications and data, for use by the processor 112 of the compute instance 110. In some alternate embodiments, each of any number of compute instances 110 may include any number of processors 112 and any number of memories 116 in any combination. In particular, any number of the compute instances 110 (including one) may provide a multiprocessing environment in any technically feasible fashion.

The memory 116 may be one or more of a readily available memory, such as random-access memory, read only memory, floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory, an optical storage device, a magnetic storage device, or any suitable combination of the foregoing.

In general, each of the compute instances 110 is configured to implement one or more applications or subsystems of applications. For explanatory purposes only, each application is described as residing in the memory 116 of a single compute instance 110 and executing on a processor 112 of the single compute instance 110. However, in alternate embodiments, the functionality of each application may be distributed across any number of other applications that reside in the memories 116 of any number of compute instances 110 and execute on the processors 112 of any number of compute instances 110 in any combination. Further, the functionality of any number of applications or subsystems may be consolidated into a single application or subsystem.

In particular, the compute instance 110(2) is configured to estimate the perceived audio quality of the target audio clip 126. As referred to herein, the "perceived" audio quality of a target audio clip 126 is the quality as perceived by listeners of the target audio clip 126. In some embodiments, the listeners are people. In some alternate embodiments, the listeners can include, without limitation, any number of people, any number and/or types of animals (e.g., dogs), any number and/or types of software applications, and/or any number and/or types of hardware devices in any combination. For example, the listeners could be any number of software applications that automatically transcribe dialog included in the target audio clip 126.

The target audio clip 126 and the target reference audio clips 128 are both audio clips. As referred to herein, an audio clip is a discrete portion of an audio signal and can include any number and/or types of audio content. For example, an audio clip can include, without limitation, dialogue featuring both male and female voices, sound effects, background music, etc. In some embodiments, the audio clip may be included in a media sequence that also includes any amount and type of video content.

The target audio clip 126 is associated with the target reference audio clip 128. In some embodiments, the target audio clip 126 is derived from the target reference audio clip 128 via any number and/or types of audio algorithms. Some examples of audio algorithms includes, without limitation, audio coders, filtering algorithms, source separation algorithms, etc. In some embodiments, relative to the target reference audio clip 128, the target audio clip 126 includes, without limitation, any number of audio distortions. In some embodiments, any number of the audio distortions are artifacts are introduced by one or more audio algorithms. In the same or other embodiments, the target audio clip 126 can include, without limitation, any number and/or types of artifacts.

As described previously herein, one prior art approach to computationally estimating the perceived audio quality level of a target audio clip involves computing a quality score using a conventional perceptual quality model that has been trained using training data that consists of labeled audio clips. The labels associated with the different audio clips are determined from subjective quality scores assigned by human listeners.

One drawback of conventional perceptual quality models trained using labeled audio clips is that these types of perceptual quality models typically lack robustness. More specifically, and as described previously herein, because determining the different labels for the labeled audio clips can be quite time consuming, conventional perceptual quality models are oftentimes trained using only a small number of labeled audio clips that represent only limited types of audio content and audio artifacts. Consequently, in cases where the target audio clip include types of audio content or types of audio artifacts not represented in any of the labeled audio clips, the perceptual quality model, most likely, is not going to be able to accurately predict how human listeners are going to perceive the quality of those target audio clips. Some other conventional approaches to computationally estimating the perceived audio quality level of a target audio clip are targeted toward a subset of audio content (e.g., speech) and are usually unable to accurate estimate the perceived audio quality level of a target audio clip that include other types of audio content.

Generating a Trained MTL Model Based on Unlabeled Data

To address the above problems, the compute instance 110(1) includes, without limitation, a training application 130 that generates a trained MTL model 178 based on the unlabeled dataset 120 and the pseudo ground truth models 102(1)-102(M). As persons skilled in the art will recognize, training an MTL model involves teaching the MTL model to jointly perform multiple tasks using at least a partially shared representation. To generate the trained MTL model 178, the training application 130 trains an untrained MTL model (not shown) to jointly perform the M tasks of approximating at least a portion of the functionality of each of the pseudo ground truth models 102(1)-102(M). For instance, in some embodiments, the trained MTL model 178 estimates the M outputs of the pseudo ground truth models 102(1)-102(M).

In some alternate embodiments, to generate the trained MTL model 178, the training application 130 trains an untrained MTL model to jointly perform any number and/or types of quality-related assessments. For instance, in some alternate embodiments, the training application 130 trains an untrained MTL model to jointly perform the tasks of predicting the existence of clipping artifact(s) and approximating at least a portion of the functionality of each of the pseudo ground truth models 102(1)-102(M). In the same or other embodiments, the trained MTL model 178 estimates a Boolean metric value that corresponds to the existence of clipping artifacts and M perceptual quality metric values that estimate the outputs of the pseudo ground truth models 102(1)-102(M).

As shown, the unlabeled dataset 120 includes, without limitation, training audio clips 122(1)-122(N) and training reference audio clips 124(1)-124(N), where N is any positive integer. Each of the training audio clips 122(1)-122(N) and each of the training reference audio clips 124(1)-124(N) is an audio clip. The training audio clips 122(1)-122(N) are associated with the training reference audio clips 124(1)-124(N), respectively. In some embodiments, the training audio clips 122(1)-122(N) are derived from the training reference audio clips 124(1)-124(N), respectively, via any number and/or type of audio algorithms. The unlabeled dataset 120 is also referred to herein as "training data." In some embodiments, the training audio clips 122(1)-122(N) collectively include a wide range of different types of audio content and numerous types of audio distortions. Consequently, the range of the training data is broad with respect to both types of audio content and types of audio distortions.

In some embodiments, multiple training audio clips 122 can be associated with the same reference audio clip (e.g., derived from the same reference audio clip based on different audio algorithms) and therefore not all of the training reference audio clips 124(1)-124(N) are unique. Consequently, the total number of unique training audio clips 122 is N, but the total number of unique training reference audio clips 124 can be less than or equal to N.

Each of the pseudo ground truth models 102(1)-102(M) outputs a value of an associated source metric for an audio clip based on the audio clip and, optionally, an associated reference audio clip. The value of the associated source metric is also referred to herein as an "output value." In some embodiments, each of the pseudo ground truth models 102(1)-102(M) encapsulates, without limitation, any number and/or types of discrete portions of software, hardware, firmware and/or data structures, in any combination. For instance, in some embodiments, each of the pseudo ground truth models 102 can be an expert system, a trained neural network, a look-up table, a set of one or more equations, a set of one or more rules, a trained decision tree, any other type of algorithm, any other type of data structure, or any combination thereof. In some alternate embodiments, any number of the pseudo ground truth models 102(1)-102(M) can be hierarchical models that include, without limitation, any number and/or types of models and/or any number and/or type of algorithms in any combination. In some embodiments, at least one of the pseudo ground truth models 102 is a perceptual quality model that is trained based on subjective scores assigned by human listeners.

Each of the source metrics can be any type of metric that is relevant to audio quality. As referred to herein, a "metric" can be any defined, quantifiable measure, and a "metric value" for a metric is any type of value (e.g., an integer, a real number, a string, a Boolean, an array of any constituent values, etc.) for the metric that can be determined in any technically feasible fashion. In some embodiments, the source metrics can include, without limitation, any number and type of perceived audio quality metrics, audio quality metrics, metrics that characterize any aspects of an audio signal, metrics that characterize any aspects of audio content included in an audio signal, metrics that characterize any number and/or types of degradations (e.g., artifacts, noise, etc.) associated with an audio signal, etc., in any combination. For explanatory purposes only, the values of the source metrics are also referred to herein as "source metric values."

In some embodiments, any number of the pseudo ground truth models 102 are intrusive and the remaining pseudo ground truth models 102 are non-intrusive. If the pseudo ground truth model 102 is intrusive, then the pseudo ground truth model 102 determines a source metric value for an audio clip based on both the audio clip and the associated reference audio clip. If the pseudo ground truth model 102 is non-intrusive, then the pseudo ground truth model 102 determines a source metric value for an audio clip based on the audio clip but not the associated reference audio clip.

Figure 2:
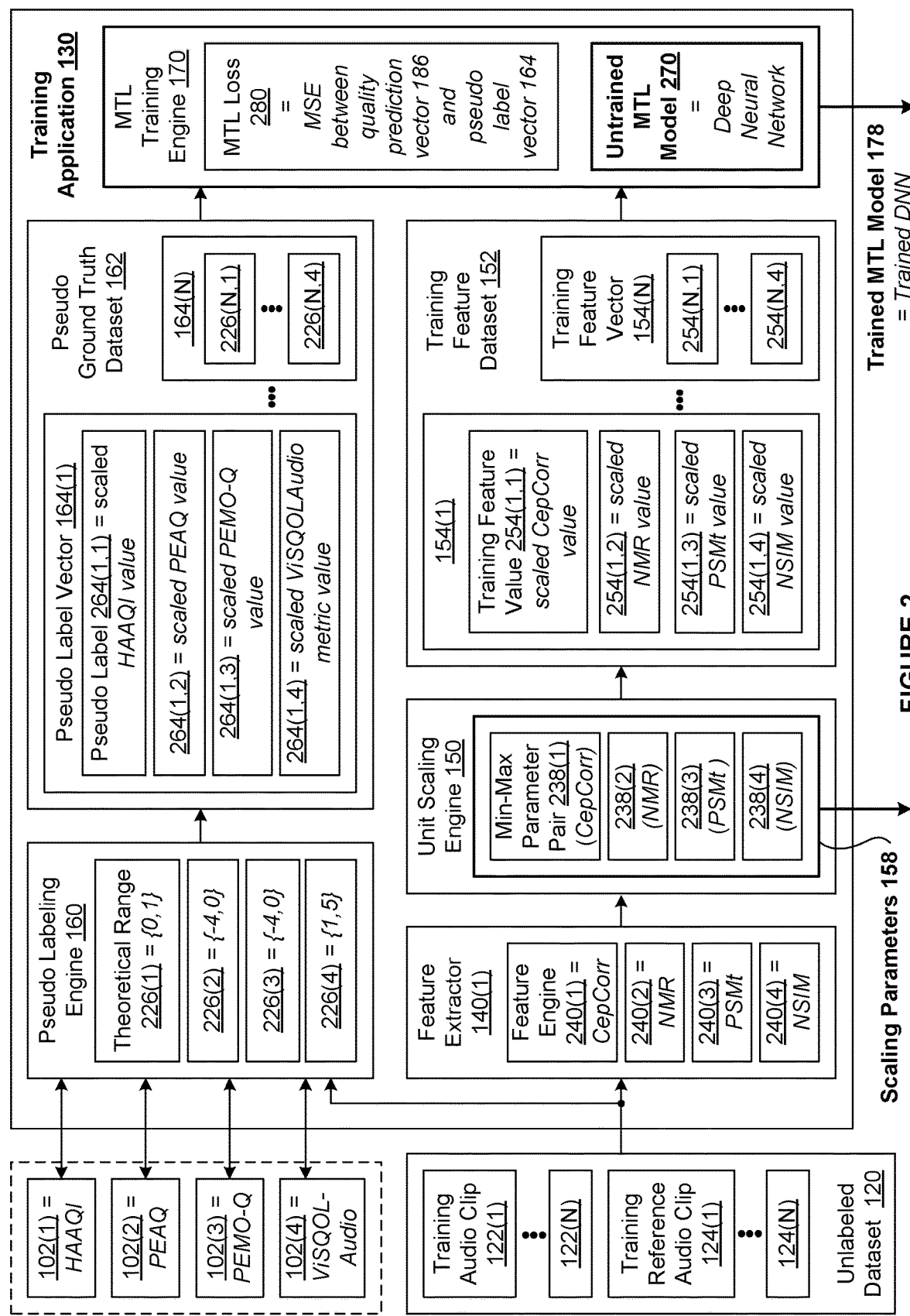
FIG. 2 is a more detailed illustration of the training application of FIG. 1, according to various embodiments.

As described in greater detail in conjunction with FIG. 2, in some embodiments, each of the pseudo ground truth models 102 is a different expert system that computes a value for a different perceived audio quality metric based on an audio clip and the associated reference audio clip. Some other examples of pseudo ground truth models 102 include, without limitation, an equation that computes a signal-to-noise ratio, and a look-up table that returns a bitrate associated with a compressed version of the audio clip, to name a few.

For explanatory purposes only, as used herein, the character 'x' denotes an integer from 1 to N, where N is the total number of training audio clips 122. And, as used herein, the character 'y' denotes an integer from 1 to M, where M is the total number of the pseudo ground truth models 102.

The training application 130 resides in the memory 116(1) of the compute instance 110(1) and executes on the processor 112(1) of the compute instance 110(1). As shown, the training application 130 includes, without limitation, a pseudo labeling engine 160, a pseudo ground truth dataset 162, a feature extractor 140(1), a unit scaling engine 150, a training feature dataset 152, and an MTL training engine 170.

The pseudo labeling engine 160 generates the pseudo ground truth dataset 162 based on the unlabeled dataset 120 and the pseudo ground truth models 102(1)-102(M). As shown, the pseudo ground truth dataset 162 includes, without limitation, pseudo label vectors 164(1)-164(N). The pseudo label vectors 164(1)-164(N) are associated with the training audio clips 122(1)-122(N), respectively. Although not shown in FIG. 1, each of the pseudo label vectors 164(1)-164(N) includes, without limitation, M pseudo labels, where each of the pseudo labels is associated with a different pseudo ground truth model 102. For explanatory purposes only. the $y^{th}$ pseudo label included in each of the pseudo label vectors 164 is associated with the pseudo ground truth model 102($y$).

In some embodiments, the $y^{th}$ pseudo label included in the pseudo label vector 164($x$) is a scaled version of the source metric value generated by the pseudo ground truth model 102($y$) for the training audio clip 122($x$). To generate the $y^{th}$ pseudo label that is included in the pseudo label vector 164($x$), the pseudo labeling engine 160 causes the pseudo ground truth model 102($y$) to compute a source metric value for the training audio clip 122(x) based on the training audio clip 122(x) and, optionally, the training reference audio clip 124(x). The pseudo labeling engine 160 linearly scales the source metric value to a range of 0 to 1 based on the theoretical range of the associated source metric to compute the $y^{th}$ pseudo label included in the pseudo label vector 164(x). In some embodiments, the theoretical range of the associated source metric is the theoretical range of an output of the pseudo ground truth model 102(y).

As shown, the pseudo ground truth dataset 162 is an input to the MTL training engine 170 that, as described below, generates the trained MTL model 178. In particular, the pseudo label vector 164(x) specifies, for the training audio clip 122(x), a different value for each of M MTL metrics (not shown). As part of generating the trained MTL model 178, the MTL training engine 170 associates each of the MTL metrics with a different output of the trained MTL model 178. Notably, each of the MTL metrics is a scaled version of a different source metric and is therefore associated with a different pseudo ground truth model 102. Furthermore, each of the MTL metrics is relevant to audio quality.

In alternate embodiments, the pseudo labeling engine 160 can compute the pseudo ground truth dataset 162, the pseudo label vectors 164, and the pseudo labels in any technically feasible fashion. In some alternate embodiments, the pseudo labeling engine 160 scales the source metric values to any range using any number and/or types of scaling techniques and based on any amount and/or type of data. In other alternate embodiments, the pseudo labeling engine 160 sets each pseudo label equal to the associated source metric value without performing any scaling operations.

Together, the feature extractor 140(1) and the unit scaling engine 150 generate the training feature dataset 152 based on the unlabeled dataset 120. As shown, the training feature dataset 152 includes, without limitation, training feature vectors 154(1)-154(N). Although not shown in FIG. 1, each of the training feature vectors 154(1)-154(N) includes, without limitation, F values for F audio features, where F is any integer greater than one. The F audio features are also referred to herein as "the set of audio features," and the F values for the F audio features are also referred to herein as "the set of feature values for the set of audio features" and "the set of feature values of the set of audio features."

As part of generating the trained MTL model 178, the MTL training engine 170 associates each of the audio features with a different input of the trained MTL model 178. Each of the audio features is a scaled version of a different source feature, where each source feature is any type of feature that characterizes any aspect of an audio signal in any technically feasible fashion. For instance, in some embodiments, the source features characterize different psycho-acoustics aspects of an audio signal and/or different impacts of the audio signal on the human auditory system. Any number (including zero) of the source features are also features of one or more of the pseudo ground truth models 102. In some embodiments, each of the source features characterizes the perceptual relevance of an audio signal from a different perspective. The F source features are also referred to herein as "the set of source features," and the F values for the F source features are also referred to herein as "the set of feature values for the set of source features" and "the set of feature values of the set of source features."

For each training audio clip 122(x), the feature extractor 140(1) computes F values for the F source features based on the training audio clip 122(x) and, optionally, the training reference audio clip 124(x). The feature extractor 140(1) may compute the values for the source features in any technically feasible fashion. For explanatory purposes only, a value of a feature is also referred to herein as a "feature value", a value of an audio feature is also referred to herein as an "audio feature value," and a value of a source feature is also referred to herein as a "source feature value,"

As shown, the unit scaling engine 150 generate scaling parameters 158 based on the source feature values. Although not shown in FIG. 1, the scaling parameters 158 include, without limitation, any number and type of parameters that are used to scale values for each source feature to values for the corresponding audio feature. Subsequently, the unit scaling engine 150 performs scaling operations on the source feature values based on the scaling parameters 158 to compute audio feature values that are within a shared range (e.g., 0 to 1). The unit scaling engine 150 may generate the scaling parameters 158 and perform any number and type of scaling operations on the source feature values in any technically feasible fashion.

For instance, in some embodiments, the scaling parameters 158 include, without limitation, F min-max parameter pairs (not shown in FIG. 1). Each mix-max parameter pair is associated with a different source feature and specifies the minimum source feature value included in the N associated source feature values and the maximum source feature value included in the N associated source features values. Subsequently, for each of the F source features, the unit scaling engine 150 performs a min-max scaling on the N associated source feature values based on the associated min-max parameter pair to compute the N corresponding audio feature values. Performing min-max scaling on a value is also referred to herein as performing one or more min-max scaling operations on the value.

The unit scaling engine 150 then generates the training feature vectors 154(1)-154(N) based on the audio feature values that are associated with the training audio clips 122(1)-122(N), respectively. The unit scaling engine 150 aggregates the training feature vectors 154(1)-154(N) to generate the training feature dataset 152. As shown, the training feature dataset 152 is an input to the MTL training engine 170. Notably, the training feature vector 154(x) specifies, for the training audio clip 122(x), F values for the F audio features.

In some alternate embodiments, the unit scaling engine 150 can generate the scaling parameters 158 and the training feature dataset 152 in any technically feasible fashion. In some alternate embodiments, the unit scaling engine 150 does not generate the scaling parameters 158. In the same or other alternate embodiments, the unit scaling engine 150 sets the audio feature values equal to the source feature values instead of scaled source features values.

As shown, the MTL training engine 170 generates the trained MTL model 178 based on the training feature dataset 152 and the pseudo ground truth dataset 162. In some embodiments, the MTL training engine 170 trains an untrained MTL model (not shown in FIG. 1) to jointly estimate the pseudo label vectors 164(1)-164(N) based on the training feature vectors 154(1)-154(N), respectively. The untrained MTL model can learn multiple tasks in parallel based on at least a partially shared representation.

In some embodiments, the untrained MTL model encapsulates, without limitation, any number and/or types of discrete portions of software, hardware, firmware and/or data structures, in any combination. For example, the untrained MTL model can be a neural network, a decision tree formulated as a multitask problem, a random forest formulated as a multitask problem, etc. In some embodiments, the untrained MTL model can be a hierarchical model that includes any number and/or types of models and/or any number and/or type of algorithms in any combination.

The trained MTL model 178 refers to the final version of the untrained MTL model when the training is complete. In some alternate embodiments, the untrained MTL model is replaced with a pre-trained MTL model, and the trained MTL model 178 refers to the final version of the pre-trained MTL model when the MTL training engine 170 finishes performing training operations on the pre-trained MTL model.

The MTL training engine 170 executes any number and/or types of multitask learning algorithms, other machine learning operations, and/or other operations in any combination to train the untrained MTL model based on the training feature vectors 154(1)-154(N) and the pseudo label vectors 164(1)-164(N). For example, the MTL training engine 170 could execute, without limitation, any number and/or types of multi-label regression algorithms, multi-label classification operations, multitask decision tree algorithms, etc.

As described in greater detail in conjunction with FIG. 2, in some embodiments, the MTL training engine 170 trains a deep neural network having F inputs and M outputs based on optimizing an MTL loss (not shown in FIG. 1). In some embodiments, the inputs to the untrained MTL model are the F training features values included in the training feature vector 154(x), and the MTL loss is the mean squared error ("MSE") between the M outputs of the untrained MTL model and the M pseudo label values included in the pseudo label vector 164(x). In some alternate embodiments, the MTL training engine 170 can train any number and/or types of untrained MTL models using any number and/or types of multitask learning algorithms in any combination.

The F inputs of the untrained MTL model are values for audio features and can be specified in any technically feasible fashion. In some embodiments, while the MTL training engine 170 trains the untrained MTL model, the MTL training engine 170 inputs each of the training feature vectors 154(1)-154(N) into the untrained MTL model at least once. In some embodiments, inputting the training feature vector 154(x) into the untrained MTL model refers to inputting each of the F training feature values included in the training feature vector 154(x) into the untrained MTL model.

The M outputs of the untrained MTL model are estimated values for the MTL metrics and therefore are estimated values for scaled versions of the source metrics. In some embodiments, each of the untrained MTL model and (after training) the trained MTL model 178 outputs a quality prediction vector 186. As shown, the quality prediction vector 186 includes, without limitation, predicted labels 188(1)-188(M). The predicted label 188(y) is an estimated value for the $y^{th}$ MTL metric and is associated with the pseudo ground truth model 102(y). In some embodiments, outputting the quality prediction vector 186 comprises outputting each of the predicted labels 188.

After the MTL training engine 170 completes the training of the untrained MTL model, the final version of the untrained MTL model is referred to as the trained MTL model 178. As shown, the training application 130 provides the trained MTL model 178 and the scaling parameters 158 to the quality inference application 180 and/or any number and/or types of other software applications.

The training application 130 can provide the trained MTL model 178 and the scaling parameters 158 to the quality inference application 180 in any technically feasible fashion. In some embodiments, the training application 130 transmits the trained MTL model 178 and the scaling parameters 158 to the quality inference application 180. In the same or other embodiments, the training application 130 stores the trained MTL model 178 and the scaling parameters 158 in memory that is accessible to the quality inference application 180. In some alternate embodiments, the quality inference application 180 acquires (e.g., receives from the training application 130 or reads from memory) the trained MTL model 178 and the scaling parameters 158.

In some alternate embodiments, the trained MTL model 178 refers to the combination of the untrained MTL model and the final values of any number of parameters (e.g., weights and biases) included in the untrained MTL model. In some alternate embodiments, the training application 130 provides the final values of the parameters included in the untrained MTL model instead of the trained MTL model 178 to the quality inference application 180.

As shown, the quality inference application 180 computes an overall quality score 198 for the target audio clip 126 based on the target audio clip 126, the target reference audio clip 128, the scaling parameters 158, and the trained MTL model 178. The overall quality score 198 is also referred to herein as the "audio quality score." The quality inference application 180 resides in the memory 116(2) of the compute instance 110(2) and executes on the processor 112(2) of the compute instance 110(2). As shown, the quality inference application 180 includes, without limitation, a feature extractor 140(2), a scaling engine 182, a target feature vector 184, the trained MTL model 178, the quality prediction vector 186, and an overall quality engine 190.

The feature extractor 140(2) is a different instance of the feature extractor 140(1) described in detail previously herein in the context of the training application 130. The feature extractor 140(2) has the same functionality as the feature extractor 140(1). The feature extractor 140(2) computes values for the F source features based on the target audio clip 126 and the target reference audio clip 128. The feature extractor 140(2) may compute the values for the source features in any technically feasible fashion.

As shown, the scaling engine 182 generates the target feature vector 184 based on the scaling parameters 158 and the source feature values. The scaling engine 182 can perform any type of scaling that is consistent with the scaling parameters 158 and the unit scaling engine 150. In some embodiments, and as described previously herein in conjunction with the unit scaling engine 150, the scaling parameters 158 includes, without limitation, F min-max parameter pairs (not shown in FIG. 1). For each of the F source features, the scaling engine 182 performs min-max scaling on the source feature value based on the associated min-max parameter pair to compute the associated audio feature value for the target audio clip 126.

Subsequently, the scaling engine 182 generates the target feature vector 184. As described in greater detail in conjunction with FIG. 3, the target feature vector 184 includes, without limitation, F target feature values (not shown in FIG. 1). Each of the target feature values is a value for a different audio feature. More specifically, the audio feature values for the target audio clip 126 are also the target feature values. The scaling engine 182 aggregates the audio feature values for the target audio clip 126 to generate the target feature vector 184.

The quality inference application 180 inputs the target feature vector 184 into the trained MTL model 178 and, in response, the trained MTL model 178 generates the quality prediction vector 186. As shown, the quality prediction vector 186 includes, without limitation, the predicted labels 188(1)-188(M). The predicted label 188(y) estimates the value of the $y^{th}$ MTL metric for the target audio clip 126. In some alternate embodiments, the quality inference application 180 can cause the trained MTL model 178 to generate the quality prediction vector 186 in any technically feasible fashion.

As shown, the overall quality engine 190 generates the overall quality score 198 based on the quality prediction vector 186. The overall quality score 198 estimates a perceived audio quality level of the target audio clip 126. In some embodiments, the target audio clip 126 is derived from the target reference audio clip 128 using an audio algorithm, and the overall quality score 198 indicates an audio quality versus processing efficiency tradeoff associated with the audio algorithm and/or a perceptual impact associated with the audio algorithm. Some examples of audio algorithms include, without limitation, audio coders, filtering algorithms, source separation algorithms, etc.

Figure 3:
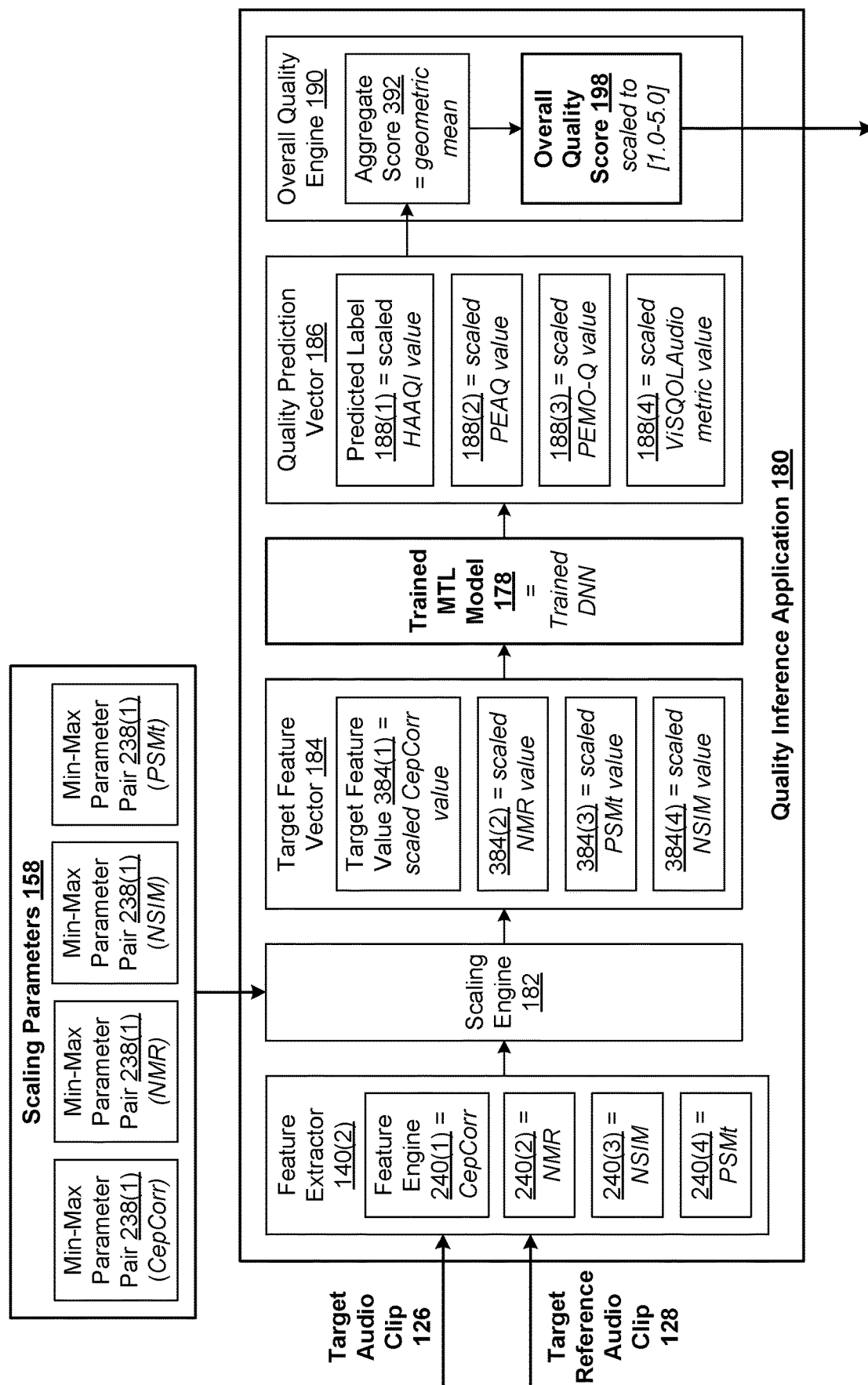
FIG. 3 is a more detailed illustration of the quality inference application of FIG. 1, according to various embodiments.

The overall quality engine 190 can compute the overall quality score 198 in any technically feasible fashion. For instance, in some embodiments and as depicted in FIG. 3, the overall quality engine 190 computes a geometry mean of the predicted labels 188(1)-188(M) to generate an aggregate score (not shown in FIG. 1). The overall quality engine 190 linearly scales the aggregate score to a range of 1.0 (lowest) to 5.0 (highest) to generate the overall quality score 198 for the target audio clip 126. As persons skilled in the art will recognize, the range of 1.0 to 5.0 corresponds to the typical range associated with mean opinion scores ("MOSs").

In some alternate embodiments, the overall quality engine 190 can perform any number and/or type of aggregation operations, any number and/or type of scaling operations, and/or any number and/or type of any other operations on the predicted labels 188(1)-188(N) to generate the overall quality score 198. For instance, in some alternate embodiments, the overall quality engine 190 computes a weighted arithmetic mean of the predicted labels 188(1)-188(M), where the weights are determined based on the predominant type of audio content included in the target audio clip 126. In the same or other embodiments, the overall quality engine 190 filters outliers from the predicted labels 188(1)-188(M) prior to computing the overall quality score 198.

In some alternate embodiments, the overall quality engine 190 can be a machine learning model that performs, without limitation any number and/or types of linear and/or non-linear operations based on any number of the predicted labels 188(1)-188(M) to compute the overall quality score 198. For example, the overall quality engine 190 could be a linear regression model, a support vector machine, a neural network, a composite model, any other type of model, or any combination thereof.

For explanatory purposes only, the system 100 includes, without limitation, a single target audio clip 126 and a single target reference audio clip 128, and the quality inference application 180 computes a single overall quality score 198 for the single target audio clip 126. In alternate embodiments, the system 100 includes, without limitation, any number of target audio clips 126 and the associated target reference audio clips 128, and the quality inference application 180 computes a different overall quality score 198 for each of the target audio clips 126.

Advantageously, because generating the trained MTL model 178 does not rely on obtaining subjective scores from people, the total number of the training audio clips 122 is not constrained by the amount of time required to perform subjective listening tests. Consequently, the types of audio content and artifacts represented in the training audio clips 122 and, therefore, the generality of the trained MTL model 178 can be increased relative to prior art techniques that require labeled training audio clips. Furthermore, because the trained MTL model 178 is trained to perform multiple quality-related assessments jointly, the trained MTL model 178 learns to generalize with respect to the training audio clips 122 based on commonalities and differences between the pseudo ground truth models 102. As a result, the accuracy and the generality of the trained MTL model 178 are further increased.

Note that the techniques described herein are illustrative rather than restrictive and may be altered without departing from the broader spirit and scope of the invention. Many modifications and variations on the functionality provided by the training application 130, the pseudo labeling engine 160, the feature extractors 140(1)-140(2), the unit scaling engine 150, the MTL training engine 170, the scaling engine 182, and the overall quality engine 190 will be apparent to those of ordinary skill in the art without departing from the scope and spirit of the described embodiments It will be appreciated that the system 100 shown herein is illustrative and that variations and modifications are possible. For instance, in some alternate embodiments, the functionality provided by the unit scaling engine 150 as described herein is integrated into the feature extractor 140(1). In the same or other alternate embodiments, the functionality provided by the training application 130 and the functionality provided by the quality inference application 180 are integrated into a single application. Further, the connection topology between the various components in FIG. 1 may be modified as desired.

FIG. 2 is a more detailed illustration of the training application 130 of FIG. 1, according to various embodiments. In particular, FIG. 2 describes some embodiments in which the total number of pseudo ground truth models 102 (denoted herein as M) is equal to four, the total number of training feature values 254 (denoted herein as F) included in each of the training feature vectors 154 is equal to four, and the trained MTL model 178 is a trained deep neural network.

Note that the descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

As shown, the training application 130 generates the trained MTL model 178 based on the unlabeled dataset 120 and the pseudo ground truth models 102(1)-102(4). As described previously herein in conjunction with FIG. 1, the unlabeled dataset 120 includes, without limitation, the training audio clips 122(1)-122(N) and the training reference audio clips 124(1)-124(N). Furthermore, the training audio clip 122($x$) is associated with the training reference audio clip 124($x$).

Each of the pseudo ground truth models 102(1)-102(4) is a different expert system that outputs a value of a different source metric for an audio clip based on the audio clip and the associated reference audio clip. As depicted in italics, the pseudo ground truth model 102(1) is a Hearing-Aid Audio Quality Index ("HAAQI") expert system that computes values for a metric referred to herein as HAAQI. A value of the HAAQI is also referred to herein as an "HAAQI value." The pseudo ground truth model 102(2) is a Perceptual Evaluation of Audio Quality ("PEAQ") expert system that computes values for a metric referred to herein as PEAQ. A value of the PEAQ is also referred to herein as a "PEAQ value." The pseudo ground truth model 102(3) is a Perception Model Quality ("PEMO-Q") expert system that computes values for a metric referred to herein as PEMO-Q. A value of PEMO-Q is also referred to herein as a "PEMO-Q value." The pseudo ground truth model 102(4) is a Virtual Speech Quality Objective Listener Audio ("ViSQOLAudio") expert system that computes values for a metric referred to herein as a ViSQOLAudio metric. A value of the ViSQOLAudio metric is also referred to herein as a "ViSQOLAudio value."

As shown, the training application 130 includes, without limitation, the pseudo labeling engine 160, the pseudo ground truth dataset 162, the feature extractor 140(1), the unit scaling engine 150, the training feature dataset 152, and the MTL training engine 170. The pseudo labeling engine 160 generates the pseudo ground truth dataset 162 based on the unlabeled dataset 120 and the pseudo ground truth models 102(1)-102(4).

As shown, the pseudo labeling engine 160 includes, without limitation, theoretical ranges 226(1)-226(4). The theoretical ranges 226(1)-226(4) specify the range of source metric values (from a minimum to a maximum) that can, theoretically, be output by the pseudo ground truth models 102(1)-102(4), respectively. The theoretical range 226(1) is associated with the pseudo ground truth model 102(1) (an HAAQI expert system) and, as depicted in italics, is 0 to 1. The range 226(2) is associated with the pseudo ground truth model 102(2) (a PEAQ expert system) and, as depicted in italics, is −4 to 0. The range 226(3) is associated with the pseudo ground truth model 102(3) (a PEMO-Q expert system) and, as depicted in italics, is −4 to 0. The range 226(4) is associated with the pseudo ground truth model 102(4) (a ViSQOLAudio expert system) and, as depicted in italics, is 1 to 5.

For each training audio clip 122(x), the pseudo labeling engine 160 generates a pseudo label vector 164(x) based on the theoretical ranges 226(1)-226(4), the training audio clip 122(x), and the training reference audio clip 124(x). The pseudo label vector 164(x) includes, without limitation, pseudo labels 264(x,1)-264(x,4). For example, and as shown, the pseudo label vector 164(1) includes, without limitation, the pseudo labels 264(1,1)-264(1,4). As also shown, the pseudo label vector 164(N) includes, without limitation, the pseudo labels 264(N,1)-264(N,4).

To generate the pseudo label vector 164(x), the pseudo labeling engine 160 generates the pseudo label 264(x, 1), the pseudo label 264(x, 2), the pseudo label 264(x, 3), and the pseudo label 264(x, 4). For explanatory purposes only, the pseudo label 264(x, y) is associated with both the training audio clip 122(x) and the pseudo ground truth model 102(y). To compute the pseudo label 264(x, y), the pseudo labeling engine 160 uses the pseudo ground truth model 102(y) to compute a value for the associated source metric based on the training audio clip 122(x) and the training reference audio clip 124(x).

The pseudo labeling engine 160 can cause the pseudo ground truth model 102(y) to compute a value for the associated source metric in any technically feasible fashion. For instance, in some embodiments, the pseudo labeling engine 160 inputs the training audio clip 122(x) and the training reference audio clip 124(x) into the pseudo ground truth model 102(y) and, in response, the pseudo ground truth model 102(y) outputs a value of the associated source metric for the training audio clip 122(x)

The pseudo labeling engine 160 then linearly scales the source metric value to a range of 0 to 1 based on the theoretical range 226(y) associated with the pseudo ground truth model 102(y) to generate the scaled source metric value that is associated with both the training audio clip 122(x) and the pseudo ground truth model 102(y). The pseudo labeling engine 160 sets the pseudo label 264 (x, y) equal to the scaled source metric value.

For each of the training audio clips 122(x), the pseudo labeling engine 160 aggregates the pseudo labels 264(x, 1), 264(x, 2), 264(x, 3), and 264(x, 4) to generate the pseudo label vector 164(x). Each of the pseudo labels 264(1)-264(N) therefore includes, without limitation, scaled versions of the source metric values generated by each of the pseudo ground truth models 102(1)-102(4) for the training audio clips 122(1)-122(N), respectively.

As described previously herein, the scaled versions of the source metric values are values of associated audio metrics. Furthermore, the pseudo label vector 164(x) specifies values of the audio metrics for the training audio clip 122(x). For explanatory purposes only, the audio metrics are denoted herein as a scaled HAAQI, a scaled PEAQ, a scaled PEMO-Q, and a scaled ViSQOLAudio metric. And the pseudo label vector 164(x) includes, without limitation the pseudo labels 264(x,1)-264(x,4) that are a scaled HAAQI value, a scaled PEAQ value, a scaled PEMO-Q value, and a scaled ViSQOLAudio metric value, respectively.

For instance, and as depicted, the pseudo label vector 164(1) includes, without limitation, the pseudo label 264(1, 1) that is a scaled HAAQI value for the training audio clip 122(1), the pseudo label 264(1,2) that is a scaled PEAQ value for the training audio clip 122(1), the pseudo label 264(1,3) that is a scaled PEMO-Q value for the training audio clip 122(1), and the pseudo label 264(1,4) that is a scaled ViSQOLAudio metric value for the training audio clip 122(1). The pseudo labeling engine 160 aggregates the pseudo label vectors 164(1)-164(N) to generate the pseudo ground truth dataset 162.

As shown, the feature extractor 140(1) includes, without limitation, feature engines 240(1)-240(4). Each of the feature engines 240(1)-240(4) computes a value of a different source feature for an audio clip based on the audio clip and the associated reference audio clip. As depicted in italics, the source features associated with the feature engines 240(1)-240(4) are Cepstral Correlation ("CepCorr"), Noise-to-Mask Ratio ("NMR"), Perceptual Similarity Measure ("PSMt"), and Neurogram Similarity Index Measure ("NSIM"), respectively. The feature engines 240(1)-240(4) compute a CepCorr value, an NMR value, a PSMt value, and an NSIM value, respectively, for an audio clip in any technically feasible fashion. Each of the CepCorr value, the NMR value, the PSMt value, and the NSIM value for an audio clip is a scalar that is proportional to the perceived audio quality level of the audio clip.

CepCorr is a feature that is used by the pseudo ground truth model 102(1) (an HAAQI expert system). As persons skilled in the art will recognize, HAAQI is targeted towards, without limitation, assessing music quality in audio signals received via hearing aids. NMR is a feature that is used by the pseudo ground truth model 102(2) (a PEAQ expert system). The NMR value for an audio signal is computed based on the significance of noise with respect to a masking curve. PSMt is a feature that is used by the pseudo ground truth model 102(3) (a PEMO-Q expert system). The PSMt value for an audio signal is computed based on an effective auditory signal processing process that computes the similarity between the internal representations of the audio signal and the associated audio signal. The internal representations of the audio signal and the associated audio signal are computed via a series of processing steps (e.g., gammatone filterbank, half-wave rectification, modulation filterbank, etc.) that simulate different parts of the auditory system. NSIM is a feature that is used by the pseudo ground truth model 102(4) (a ViSQOLAudio expert system). NSIM is adapted from an image quality metric known as the Structural Similarity Index that is used to measure the perceived audio quality levels of audio signals.

For each training audio clip 122($x$), the feature extractor 140(1) computes a CepCor value, an NMR value, a PSMt value, and an NSIM value for the training audio clip 122($x$) using the feature engines 240(1)-240(4), respectively. The feature engines 240(1)-240(4) compute the Cepcor value, the NRM value, the PSMt value, and the NSIM value, respectively, for the training audio clip 122($x$) based on the training audio clip 122($x$) and the training reference audio clip 124($x$).

The unit scaling engine 150 generates the scaling parameters 158 and the training feature dataset 152 based on the N CepCor values, the N NMR values, the N PSMt values, and the N NSIM values computed by the feature extractor 140(1). As shown, the scaling parameters 158 include, without limitation, min-max parameter pairs 238(1)-238(4). Each of the min-max parameter pairs 238 specifies the minimum and the maximum of the associated source feature values. The feature extractor 140(1) sets the min-max parameter pairs 238(1)-238(4) equal to the pair of the minimum and the maximum of the N CepCorr values, the N NMR values, the N PSMt values, and the N NSIM values, respectively. Note that the min-max parameter pairs 238(1)-238(4) delineate the actual ranges of the source feature values that the feature engines 240(1)-240(4), respectively, compute for the training audio clips 122(1)-122(N).

The unit scaling engine 150 performs min-max scaling on each of the N CepCorr values, the N NMR values, the N PSMt values, and the N NSIM values based on the min-max parameter pairs 238(1)-238(4), respectively, to scale each of the source feature values to a range of 0 to 1. Min-max scaling is also commonly referred to as min-max normalization. In this fashion, the unit scaling engine 150 generates N scaled CepCorr values, N scaled NMR values, N scaled PSMt values, and N scaled NSIM values.

For each of the training audio clips 122($x$), the unit scaling engine 150 generates the training feature vector 154($x$) that includes, without limitation, the training feature values 254($x$, 1), 254($x$, 2), 254($x$, 3), and 254($x$, 4). More specifically, the unit scaling engine 150 sets the training features values 254($x$, 1), 254($x$, 2), 254($x$, 3), and 254($x$, 4) equal to the scaled CepCorr value, the scaled NMR value, the scaled PSMt value, and the scaled NSIM value, respectively, that are associated with the training audio clip 122($x$).

As described previously herein in conjunction with FIG. 1, the scaled versions of the feature values are the audio feature values. More precisely, the training feature vector 154($x$) includes, without limitation, the audio feature values computed by the feature extractor 140(1) for the training audio clip 122($x$). In some embodiments, the audio features include, without limitation, a scaled CepCorr, a scaled NMR, a scaled PSMt, and a scaled NSIM. For instance, and as depicted, the training feature vector 154(1) includes, without limitation, the training feature values 254(1,1)-254(1,4) that specify a scaled CepCorr value, a scaled NRM value, a scaled PSMt value, and a scaled NSIM value, respectively, for the training audio clip 122(1). The unit scaling engine 150 aggregates the training feature vectors 154(1)-154(N) to generate the training feature dataset 152.

The MTL training engine 170 generates the trained MTL model 178 based on the training feature dataset 152 and the pseudo ground truth dataset 162. As shown, in some embodiments, the MTL training engine 170 includes, without limitation, an untrained MTL model 270 and an MTL loss 280. The untrained MTL model 270 and therefore the trained MTL model 178 has four inputs and four outputs. The four inputs of the untrained MTL model 270 are values for the F audio features and are therefore a scaled CepCorr value, a scaled NMR value, a scaled PSMt value, and a scaled NSIM value.

As described previously herein in conjunction with FIG. 1, the four outputs of the untrained MTL model 270 are the predicted labels 188(1)-188(4) that are estimates of the M MTL metrics. In some embodiments, the four outputs are a scaled HAAQI value, a scaled PEAQ value, a scaled PEMO-Q value, and a scaled ViSQOLAudio metric value.

As depicted in italics, in some embodiments the untrained MTL model 270 is a deep neural network that is fully-connected and includes, without limitation four hidden layers. Each of the first two hidden layers includes, without limitation, sixty-four neurons, the third hidden layer includes, without limitation, thirty-two neurons, and the fourth hidden layer includes, without limitation, sixteen neurons. Each of the layers uses Rectified Linear Unit functions and is followed by a dropout of 0.3. The output layer includes, without limitation, four neurons that each include, without limitation, a Sigmoid activation function.

In some alternate embodiments, the untrained MTL model 270 is a deep neural network that includes, without limitation, any number of inputs, any number of outputs, any number and/or types of layers that are shared between any number of tasks, and any number and/or types of layers that are not shared between tasks. In some alternate embodiments, the untrained MTL model 270 can encapsulate any number and/or types of discrete portions of software, hardware, firmware and/or data structures, in any combination that, together, can learn multiple tasks in parallel based on at least a partially shared representation. In some alternate embodiments, the untrained MTL model can be a hierarchical model that includes any number and/or types of models and/or any number and/or type of algorithms in any combination that, together, can learn multiple tasks in parallel based on at least a partially shared representation.

The MTL training engine 170 executes any number and/or types of multitask learning algorithms, other machine learning operations, and/or other operations in any combination to train the untrained MTL model 270 based on the pseudo label vectors 164(1)-164(N) and the training feature vectors 154(1)-154(N). As shown in italics, in some embodiments, the MTL training engine 170 trains the untrained MTL model 270 based on optimizing the MTL loss 280.

When the MTL training engine 170 inputs the training feature vector 154($x$) into the untrained MTL model 270, the untrained MTL model 270 outputs the quality prediction vector 186. The MTL training engine 170 computes sets the MTL loss 280 equal to the MSE between the quality prediction vector 186 and the pseudo label vector 164($x$). The MTL training engine 170 performs any number (including zero) and/or types of optimization operations on the MTL model 270 based on the MTL loss 280.

In some alternate embodiments, the untrained MTL model is replaced with a pre-trained MTL model, and the MTL training engine 170 executes any number and/or types of multitask training algorithms on the pre-trained MTL model to generate the trained MTL model 178. In some alternate embodiments, the MTL training engine 170 executes any number and/or types of multitask training algorithms based on the pseudo label vectors 164(1)-164(N) and the training feature vectors 154(1)-154(N) to generate the trained MTL model 178.

After the MTL training engine 170 completes the training of the untrained MTL model 270, the final version of the untrained MTL model 270 is referred to as the trained MTL model 178. The training application 130 provides the trained MTL model 178 and the scaling parameters 158 to the quality inference application 180. In some alternate embodiments, the training application 130 provides the final values of the parameters (e.g., weights and biases) included in the untrained MTL model 270 instead of the trained MTL model 178 to the quality inference application 180. In some alternate embodiments, the training application 130 provides any number and/or types of the scaling parameters 158, trained MTL model 178, and/or the final values of the parameters (e.g., weights and biases) included in the untrained MTL model 270 in any combination to any number and/or types of software applications.

Estimating Perceived Audio Quality Using a Trained MTL Model

FIG. 3 is a more detailed illustration of the quality inference application 180 of FIG. 1, according to various embodiments. For explanatory purposes only, the quality inference application 180 acquires the scaling parameters 158 and the trained MTL model 178 from the training application 130 of FIG. 2. As shown, the quality inference application 180 includes, without limitation, the feature extractor 140(2), the scaling engine 182, the target feature vector 184, the trained MTL model 178, the quality prediction vector 186, and the overall quality engine 190.

The feature extractor 140(2) has the same functionality as the feature extractor 140(1) described in detail previously herein in conjunction with FIG. 2. As shown, the feature extractor 140(2) includes, without limitation, the feature engines 240(1)-240(4). The feature engines 240(1)-240(4) compute a CepCorr value, an NMR value, a PSMt value, and an NSIM value, respectively, for the target audio clip 126 based on the target audio clip 126 and the target reference audio clip 128.

The scaling engine 182 generates the target feature vector 184 based on the scaling parameters 158, the CepCorr value, the NMR value, the PSMt value, and the NSIM value. As described previously herein in conjunction with FIG. 2, the scaling parameters 158 include, without limitation, the min-max parameter pairs 238(1)-238(4) that are associated with CepCorr, NMR, PSMt, and NSIM, respectively.

In some embodiments, the scaling engine 182 performs min-max scaling on the CepCorr value based on the min-max parameter pair 238(1) to scale the CepCorr value to a range of 0 to 1. The scaling engine 182 performs min-max scaling on the NMR value based on the min-max parameter pair 238(2) to scale the NMR value to a range of 0 to 1. The scaling engine 182 performs min-max scaling on the PSMt value based on the min-max parameter pair 238(3) to scale the PSMt value to a range of 0 to The scaling engine 182 performs min-max scaling on the NSIM value based on the min-max parameter pair 238(4) to scale the NSIM value to a range of 0 to 1.

Subsequently, the scaling engine 182 generates the target feature vector 184 that includes, without limitation, the target feature values 384(1)-384(4). As depicted in italics, the scaling engine 182 sets the target feature values 384(1)-384(4) equal to the scaled CepCorr value, the scaled NMR value, the scaled PSMt value, and the scaled NSIM value, respectively, The quality inference application 180 inputs the target feature vector 184 into the trained MTL model 178 and, in response, the trained MTL model 178 generates the quality prediction vector 186. In general, the quality prediction vector 186 estimates values of the MTL metrics for the target audio clip 126. As shown, the quality prediction vector 186 includes, without limitation, the predicted labels 188(1)-188(4) that specify, without limitation, a scaled HAAQI value, a scaled PEAQ value, a scaled PEMO-Q value, and a scaled ViSQOLAudio metric value, respectively, for the target audio clip 126.

The overall quality engine 190 generates the overall quality score 198 based on the quality prediction vector 186. As shown, the overall quality engine 190 computes aggregate score 392 based on the predicted labels 188(1)-188(4). The overall quality engine 190 can compute the aggregate score 392 in any technically feasible fashion. In some embodiments, and as depicted in italics, the overall quality engine 190 sets the aggregate score 392 equal to the geometric mean of the predicted labels 188. As persons skilled in the art will recognize, setting the aggregate score 392 equal to the geometric mean increases the impact of the lowest predicted label 188 on the aggregate score 392, thereby accounting for the worst case scenario. The overall quality engine 190 then linearly scales the aggregate score 392 to a range of 1.0 (lowest) to 5.0 to generate the overall quality score 198 for the target audio clip 126. As persons skilled in the art will recognize, the range of 1.0 to 5.0 is the range of the Absolute Category Rating scale which is often associated with MOSs.

The quality inference application 180 provides the overall quality score 198 to any number and/or types of software applications in any technically feasible fashion. In some embodiments, the quality inference application 180 transmits the overall quality score 198 to any number and/or types of software applications. In the same or other embodiments, the quality inference application 180 stores the overall quality score 198 in memory that is accessible to any number and/or types of software applications.

Advantageously, the overall quality score 198 reflects four different perceptual quality expert systems (an HAAQI expert system, a PEAQ expert system, a PEMO-Q expert system, and a ViSQOLAudio expert system) and audio features derived from different psycho-acoustic principles. Accordingly, empirical results have shown that both the accuracy and the generality of quality inference application 180, on average, with respect to perceived audio quality is higher than any of the HAAQI, the PEAQ, the PEMO-Q and the ViSQOLAudio expert systems.

Figure 4:
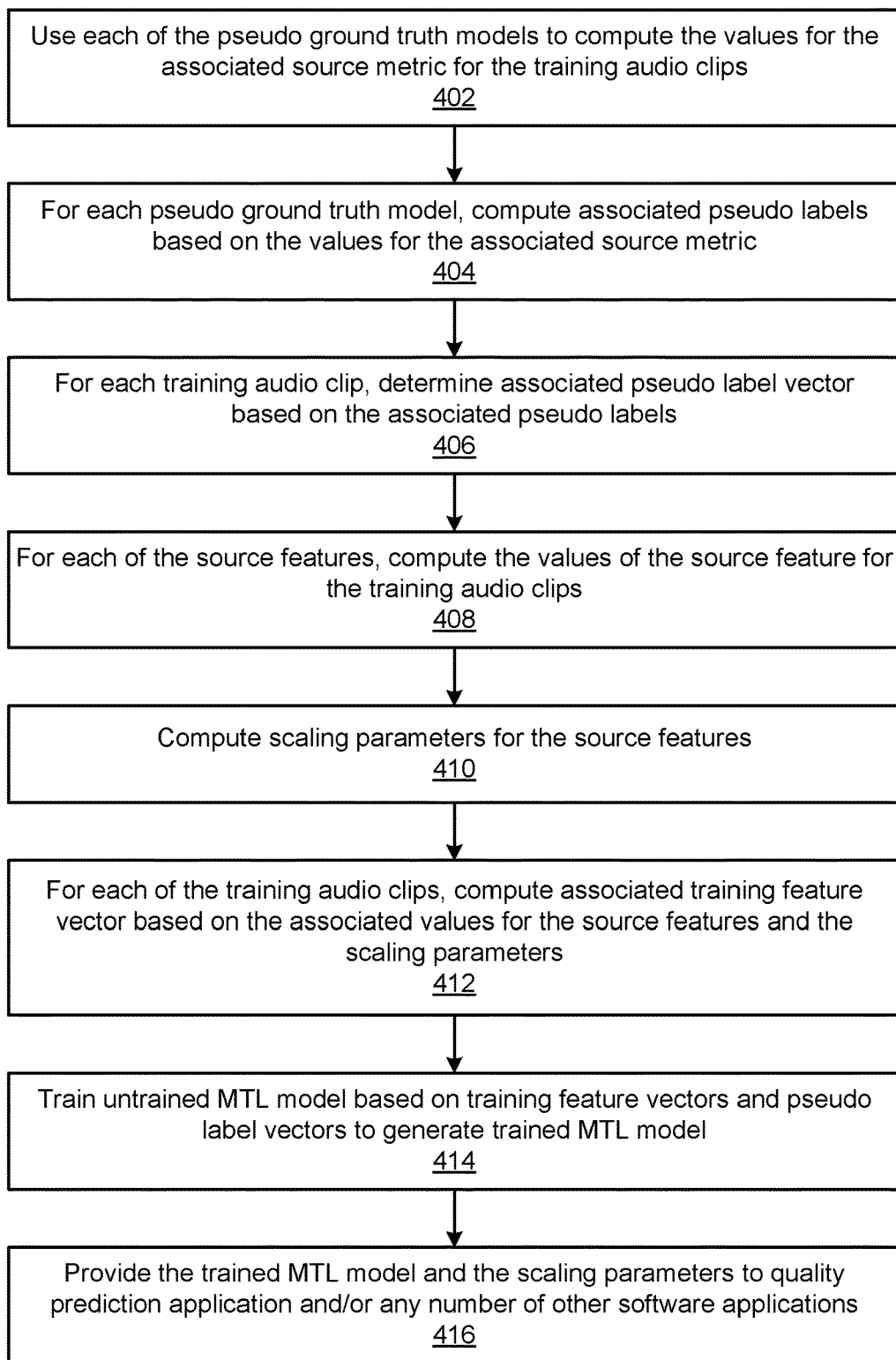
FIG. 4 is a flow diagram of method steps for training a multitask learning model to assess perceived audio quality, according to various embodiments.

FIG. 4 is a flow diagram of method steps for training a multitask learning model to assess perceived audio quality, according to various embodiments. Although the method steps are described with reference to the systems of FIGS. 1-3, persons skilled in the art will understand that any system configured to implement the method steps, in any order, falls within the scope of the present invention.

As shown, a method 400 begins a step 402, where the pseudo labeling engine 160 uses each of the pseudo ground truth models 102 to compute the values for the associated source metric for the training audio clips 122. At step 404, for each of the pseudo ground truth models 102, the pseudo labeling engine 160 computes the pseudo labels 264 associated with the pseudo ground truth model 102 based on the values for the associated source metric. At step 406, for each of the training audio clips 122, the pseudo labeling engine 160 determines the pseudo label vector 164 associated with the training audio clip 122 based on the pseudo labels 264 associated with the training audio clip 122.

At step 408, for each of the source features, the feature extractor 140(1) computes the values of the source feature for the training audio clips 122. At step 410, the unit scaling engine 150 computes the scaling parameters 158 for the source features. At step 412, for each of the training audio clips 122, the unit scaling engine 150 computes the training feature vector 154 associated with the training audio clip 122 based on the associated values for the source features and the scaling parameters 158.

At step 414, the MTL training engine 170 trains the untrained MTL model 270 based on the training feature vectors 154(1)-154(N) and the pseudo label vectors 164(1)-164(N) to generate the trained MTL model 178. At step 416, the training application 130 provides the trained MTL model 178 and the scaling parameters 158 to the quality inference application 180 and/or any number and/or types of other software applications. The method 400 then terminates.

Figure 5:
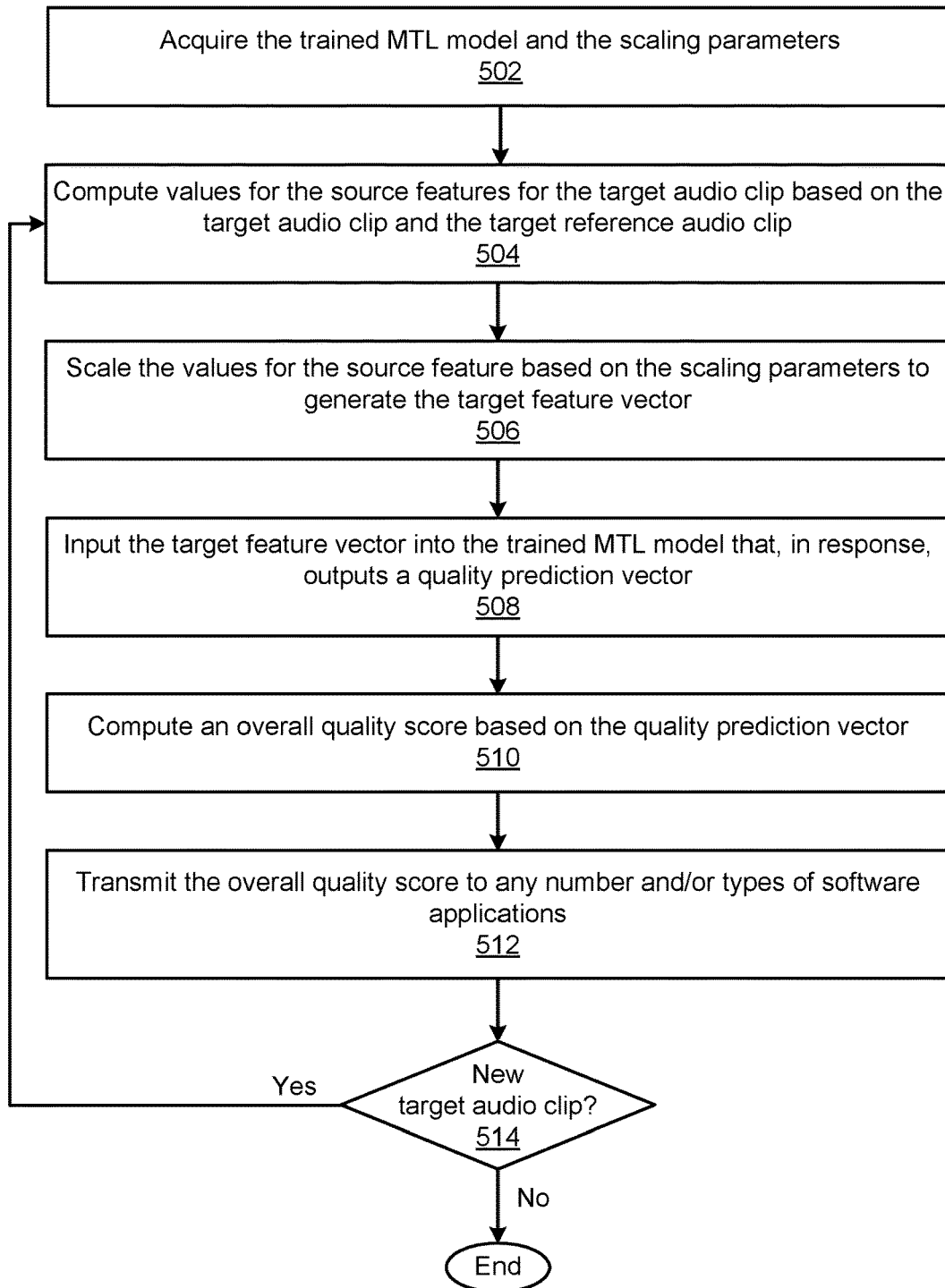
FIG. 5 is a flow diagram of method steps for estimating perceived audio quality using a trained multitask learning model, according to various embodiments.

FIG. 5 is a flow diagram of method steps for estimating perceived audio quality using a trained multitask learning model, according to various embodiments. Although the method steps are described with reference to the systems of FIGS. 1-3, persons skilled in the art will understand that any system configured to implement the method steps, in any order, falls within the scope of the present invention.

As shown, a method 500 begins a step 502, where the quality inference application 180 acquires the trained MTL model 178 and the scaling parameters 158. At step 504, the feature extractor 140(2) computes the values for the source features for the target audio clip 126. At step 506, the scaling engine 182 scales the source features based on the scaling parameters 158 to generate the target feature vector 184.

At step 508, the quality inference application 180 inputs the target feature vector 184 into the trained MTL model 178 that, in response, outputs the quality prediction vector 186. At step 510, the overall quality engine 190 computes the overall quality score 198 based on the quality prediction vector 186. At step 512, the quality inference application 180 transmits the overall quality score 198 to any number and/or types of software applications.

At step 514, the quality inference application 180 determines whether the quality inference application 180 has received a new target audio clip 126. If, at step 514, the quality inference application 180 determines that the quality inference application 180 has not received a new target audio clip 126, then the method 500 terminates.

If, however, at step 514, the quality inference application 180 determines that the quality inference application 180 has received a new target audio clip 126, then the method returns to step 504, where the feature extractor 140(2) computes the values for the source features for the new target audio clip 126. The method 500 continues to cycle through steps 504-514 until the quality inference application 180 determines, at step 514, that the quality inference application 180 has not received a new target audio clip 126. The method 500 then terminates.

In sum, the disclosed technique can be used to generate a trained MTL model that is used by a quality inference application to accurately and robustly estimate the perceived audio quality levels of target audio clips. In some embodiments, a training application generates a trained MTL model based on N training audio clips, the training reference audio clips from which the training audio clips are derived, and M pseudo ground truth models, where N and M are integers greater than 1. Each pseudo ground truth model maps an audio clip and, optionally, the associated reference audio clip to a value of a different source metric that is relevant to audio quality.

The training application includes, without limitation, a pseudo labeling engine, a feature extractor, a unit scaling engine, and an MTL training engine. The pseudo labeling engine uses the M pseudo ground truth models to compute a different pseudo label vector for each of the N training audio clips. Each of the pseudo label vectors includes, without limitation, M pseudo labels that specify values for M MTL metrics, respectively. Each of the MTL metrics is relevant to audio quality. For each of the N training audio clips, the feature extractor computes F values for F source features. The unit scaling engine computes scaling parameters based on the values for the source features. The unit scaling engine computes a different training feature vector for each of the N training audio clips based on the values for the source features and the scaling parameters. The MTL training engine trains an untrained MTL model based on the training feature vectors and the pseudo label vectors. The training application then transmits the trained MTL model and the associated scaling parameters to the quality inference application and/or any number of other software applications.

The quality inference application includes, without limitation, the feature extractor, a scaling engine, the trained MTL model, and an overall quality engine. Upon receiving a target audio clip and an associated target reference audio clip, the feature extractor computes F values for the F source features. The scaling engine scales the F values for the F source features based on the scaling parameters to generate a target feature vector. The quality inference application inputs the target feature vector into the trained MTL model. In response, the trained MTL model outputs a quality prediction vector that includes, without limitation, M predicted labels that estimate values for the M MTL metrics. The overall quality engine computes the geometry mean of the M predicted labels and then scales the geometry mean to generate an overall quality score that estimates the perceived audio quality level of the target audio clip.

At least one technical advantage of the disclosed techniques relative to the prior art is that the quality inference application can use the trained MTL model to reliably and accurately estimate perceived audio quality levels for audio clips spanning diverse types of audio content and audio distortions. Because the training application trains the multitask learning model based on unlabeled data, the multitask learning model can be efficiently trained using a broad range of training data. In particular, the training data can properly represent wide ranges of non-verbal content, verbal content, and audio distortions. As a result, the trained MTL model can accurately and reliably estimate audio metric values for audio clips in general. Furthermore, because the training application trains the MTL model to perform multiple quality-related assessments jointly, the MTL model learns to generalize with respect to the training audio clips based on commonalities and differences between the pseudo ground truth models, Consequently, the accuracy and the generality of the trained MTL model are further increased. These technical advantages provide one or more technological improvements over prior art approaches.

1. In some embodiments, a computer-implemented method for estimating perceived audio quality comprises computing a first set of feature values for a set of audio features based on a first audio clip, generating a first plurality of predicted labels via a trained multitask learning model based on the first set of feature values, wherein the first plurality of predicted labels specifies metric values for a plurality of metrics that are relevant to audio quality, and computing a first audio quality score for the first audio clip based on the first plurality of predicted labels.

2. The computer-implemented method of clause 1, wherein computing the first audio quality score comprises computing an aggregate score based on the first plurality of predicted labels, and performing one or more scaling operations on the aggregate score to generate the first audio quality score.

3. The computer-implemented method of clauses 1 or 2, wherein computing the first audio quality score comprises computing a geometric mean based on the first plurality of predicted labels, and scaling the geometric mean to an Absolute Category Rating scale.

4. The computer-implemented method of any of clauses 1-3, wherein the first audio clip is derived from a reference audio clip using an audio algorithm, and wherein the first audio quality score indicates a perceptual impact associated with the audio algorithm.

5. The computer-implemented method of any of clauses 1-4, wherein generating the first plurality of predicted labels comprises inputting the first set of feature values into the trained multitask learning model that, in response, outputs the first plurality of predicted labels.

6. The computer-implemented method of any of clauses 1-5, wherein a first predicted label included in the first plurality of predicted labels comprises an estimated value of a scaled Hearing-Aid Audio Quality Index, a scaled Perceptual Evaluation of Audio Quality, a scaled Perception Model Quality, or a scaled Virtual Speech Quality Objective Listener Audio metric.

7. The computer-implemented method of any of clauses 1-6, wherein a first audio feature included in the set of audio features is associated with a first psycho-acoustic principle but not a second psycho-acoustic principle, and a second audio feature included in the set of audio features is associated with the second psycho-acoustic principle but not the first psycho-acoustic principle.

8. The computer-implemented method of any of clauses 1-7, wherein computing the first set of feature values for the set of audio features comprises computing a second set of feature values for a set of source features based on the first audio clip and a first reference clip, and computing the first set of feature values for the set of audio features based on the second set of feature values for the set of source features and at least one scaling parameter associated with the trained multitask learning model.

9. The computer-implemented method of any of clauses 1-8, wherein the first audio clip includes at least one of dialogue, a sound effect, and background music.

10. The computer-implemented method of any of clauses 1-9, further comprising computing a second set of feature values for the set of audio features based on a second audio clip, generating a second plurality of predicted labels via the trained multitask learning model based on the second set of feature values, and computing a second audio quality score for the second audio clip based on the second plurality of predicted labels.

11. In some embodiments, one or more non-transitory computer readable media include instructions that, when executed by one or more processors, cause the one or more processors to estimate perceived audio quality by performing the steps of computing a first set of feature values for a set of audio features based on a first audio clip, causing a trained multitask learning model to generate a first plurality of predicted labels based on the first set of feature values, wherein the first plurality of predicted labels specifies metric values for a plurality of metrics that are relevant to audio quality, and computing a first audio quality score for the first audio clip based on the first plurality of predicted labels.

12. The one or more non-transitory computer readable media of clause 11, wherein computing the first audio quality score comprises inputting one or more predicted labels included in the first plurality of predicted labels into a machine learning model that, in response, generates the first audio quality score.

13. The one or more non-transitory computer readable media of clauses 11 or 12, wherein computing the first audio quality score comprises computing a weighted arithmetic mean based on the first plurality of predicted labels.

14. The one or more non-transitory computer readable media of any of clauses 11-13, wherein the first audio clip includes at least one artifact associated with an audio algorithm, and wherein the first audio quality score indicates a quality versus processing efficiency tradeoff associated with the audio algorithm.

15. The one or more non-transitory computer readable media of any of clauses 11-14, wherein causing the trained multitask learning model to generate the first plurality of predicted labels comprises inputting the first set of feature values into the trained multitask learning model.

16. The one or more non-transitory computer readable media of any of clauses 11-15, wherein a first predicted label included in the first plurality of predicted labels comprises an estimated value of a scaled Hearing-Aid Audio Quality Index, a scaled Perceptual Evaluation of Audio Quality, a scaled Perception Model Quality, or a scaled Virtual Speech Quality Objective Listener Audio metric.

17. The one or more non-transitory computer readable media of any of clauses 11-16, wherein a first audio feature included in the set of audio features is associated with a first psycho-acoustic principle but not a second psycho-acoustic principle, and a second audio feature included in the set of audio features is associated with the second psycho-acoustic principle but not the first psycho-acoustic principle.

18. The one or more non-transitory computer readable media of any of clauses 11-17, wherein computing the first set of feature values comprises computing a first feature value for a first source feature based on the first audio clip and a first reference audio clip, and performing at least one min-max scaling operation on the first feature value based on at least one scaling parameter associated with the trained multitask learning model to generate a second feature value for a first audio feature included in the set of audio features, wherein the second feature value is included in the first set of feature values.

19. The one or more non-transitory computer readable media of any of clauses 11-18, wherein the first audio clip includes at least one of dialogue, a sound effect, and background music.

20. In some embodiments, a system comprises one or more memories storing instructions, and one or more processors coupled to the one or more memories that, when executing the instructions, perform the steps of computing a first set of feature values for a set of audio features based on a first audio clip, generating a first plurality of predicted labels via a trained multitask learning model based on the first set of feature values, wherein the first plurality of predicted labels specifies metric values for a plurality of metrics that are relevant to audio quality, and performing at least one aggregation operation on the first plurality of predicted labels to compute a first audio quality score for the first audio clip.

Any and all combinations of any of the claim elements recited in any of the claims and/or any elements described in this application, in any fashion, fall within the contemplated scope of the embodiments and protection.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program codec embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory, a read-only memory, an erasable programmable read-only memory (EPROM or Flash memory), an optical fiber, a portable compact disc read-only memory, an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for estimating perceived audio quality, the method comprising:
computing a first set of feature values for a set of audio features based on a first audio clip;
generating a first plurality of predicted labels via a trained multitask learning model based on the first set of feature values, wherein the first plurality of predicted labels specifies metric values for a plurality of metrics that are relevant to audio quality;
computing a geometric mean of the first plurality of predicted labels; and
scaling the geometric mean to generate a first audio quality score for the first audio clip.

2. The computer-implemented method of claim 1, wherein scaling the geometric mean to generate computing the first audio quality score comprises scaling the geometric mean to a range of 1 to 5 corresponding to an Absolute Category Rating scale.

3. The computer-implemented method of claim 1, wherein the first audio clip is derived from a reference audio clip using an audio algorithm, and wherein the first audio quality score indicates a perceptual impact associated with the audio algorithm.

4. The computer-implemented method of claim 1, wherein generating the first plurality of predicted labels comprises inputting the first set of feature values into the trained multitask learning model that, in response, outputs the first plurality of predicted labels.

5. The computer-implemented method of claim 1, wherein a first predicted label included in the first plurality of predicted labels comprises an estimated value of a scaled Hearing-Aid Audio Quality Index, a scaled Perceptual Evaluation of Audio Quality, a scaled Perception Model Quality, or a scaled Virtual Speech Quality Objective Listener Audio metric.

6. The computer-implemented method of claim 1, wherein a first audio feature included in the set of audio features is associated with a first psycho-acoustic principle but not a second psycho-acoustic principle, and a second audio feature included in the set of audio features is associated with the second psycho-acoustic principle but not the first psycho-acoustic principle.

7. The computer-implemented method of claim 1, wherein computing the first set of feature values for the set of audio features comprises:

computing a second set of feature values for a set of source features based on the first audio clip and a first reference clip; and computing the first set of feature values for the set of audio features based on the second set of feature values for the set of source features and at least one scaling parameter associated with the trained multitask learning model.

8. The computer-implemented method of claim 1, wherein the first audio clip includes at least one of dialogue, a sound effect, and background music.

9. The computer-implemented method of claim 1, further comprising:

computing a second set of feature values for the set of audio features based on a second audio clip;

generating a second plurality of predicted labels via the trained multitask learning model based on the second set of feature values; and computing a second audio quality score for the second audio clip based on the second plurality of predicted labels.

10. One or more non-transitory computer readable media including instructions that, when executed by one or more processors, cause the one or more processors to estimate perceived audio quality by performing the steps of:

computing a first set of feature values for a set of audio features based on a first audio clip;

causing a trained multitask learning model to generate a first plurality of predicted labels based on the first set of feature values, wherein the first plurality of predicted labels specifies metric values for a plurality of metrics that are relevant to audio quality;

computing a geometric mean of the first plurality of predicted labels; and scaling the geometric mean to generate a first audio quality score for the first audio clip.

11. The one or more non-transitory computer readable media of claim 10, wherein the first audio quality score is further generated by determining a plurality of weights associated with the first plurality of predicted labels based on one or more types of audio content included in the first audio clip.

12. The one or more non-transitory computer readable media of claim 10, wherein the first audio clip includes at least one artifact associated with an audio algorithm, and wherein the first audio quality score indicates a quality versus processing efficiency tradeoff associated with the audio algorithm.

13. The one or more non-transitory computer readable media of claim 10, wherein causing the trained multitask learning model to generate the first plurality of predicted labels comprises inputting the first set of feature values into the trained multitask learning model.

14. The one or more non-transitory computer readable media of claim 10, wherein a first predicted label included in the first plurality of predicted labels comprises an estimated value of a scaled Hearing-Aid Audio Quality Index, a scaled Perceptual Evaluation of Audio Quality, a scaled Perception Model Quality, or a scaled Virtual Speech Quality Objective Listener Audio metric.

15. The one or more non-transitory computer readable media of claim 10, wherein a first audio feature included in the set of audio features is associated with a first psycho-acoustic principle but not a second psycho-acoustic principle, and a second audio feature included in the set of audio features is associated with the second psycho-acoustic principle but not the first psycho-acoustic principle.

16. The one or more non-transitory computer readable media of claim 10, wherein computing the first set of feature values comprises:

computing a first feature value for a first source feature based on the first audio clip and a first reference audio clip; and performing at least one min-max scaling operation on the first feature value based on at least one scaling parameter associated with the trained multitask learning model to generate a second feature value for a first audio feature included in the set of audio features, wherein the second feature value is included in the first set of feature values.

17. The one or more non-transitory computer readable media of claim 10, wherein the first audio clip includes at least one of dialogue, a sound effect, and background music.

18. A system comprising:

one or more memories storing instructions; and one or more processors coupled to the one or more memories that, when executing the instructions, perform the steps of:

computing a first set of feature values for a set of audio features based on a first audio clip;

generating a first plurality of predicted labels via a trained multitask learning model based on the first set of feature values, wherein the first plurality of predicted labels specifies metric values for a plurality of metrics that are relevant to audio quality;

performing at least one aggregation operation on the first plurality of predicted labels to compute an unscaled audio quality score for the first audio clip; and scaling the unscaled audio quality score to generate an audio quality score for the first audio clip.

* * * * *

UNITED STATES PATENT AND TRADEMARK OFFICE
CERTIFICATE OF CORRECTION

PATENT NO. : 11,636,872 B2
APPLICATION NO. : 16/905810
DATED : April 25, 2023
INVENTOR(S) : Chih-Wei Wu, Phillip A. Williams and William Francis Wolcott, IV It is certified that error appears in the above-identified patent and that said Letters Patent is hereby corrected as shown below:

In the Claims

Column 26, Claim 2, Line 37, please delete "computing".

Signed and Sealed this
Twenty-seventh Day of June, 2023

Katherine Kelly Vidal
*Director of the United States Patent and Trademark Office*